United States Patent
Yokobori et al.

(10) Patent No.: US 6,701,099 B2
(45) Date of Patent: Mar. 2, 2004

(54) IMAGE FORMING APPARATUS CAPABLE OF FORMING IMAGES ON RECORDING MATERIALS OF VARIOUS TYPES AND SIZES

(75) Inventors: Jun Yokobori, Kanagawa (JP); Junji Sato, Tokyo (JP); Hiroki Ueda, Tokyo (JP); Minoru Asakawa, Tokyo (JP); Takaaki Sakai, Tokyo (JP); Akio Ueda, Tokyo (JP); Chikatsu Suzuki, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/461,938

(22) Filed: Jun. 12, 2003

(65) Prior Publication Data
US 2003/0215252 A1 Nov. 20, 2003

Related U.S. Application Data

(63) Continuation of application No. 09/732,349, filed on Dec. 7, 2000, now abandoned.

(30) Foreign Application Priority Data
Dec. 13, 1999 (JP) .......................................... 11-353260

(51) Int. Cl.$^7$ .......................... G03G 15/00; B65H 3/44; B65H 5/26
(52) U.S. Cl. ........................ 399/45; 271/9.02; 271/9.05; 399/389
(58) Field of Search .......................... 399/14, 45, 389; 271/9.02, 9.03, 9.05, 9.06

(56) References Cited

U.S. PATENT DOCUMENTS

| 4,008,957 | A | 2/1977 | Summers |
| 4,933,720 | A | 6/1990 | Takano et al. |
| 5,130,757 | A | 7/1992 | Ito |
| 5,172,178 | A | 12/1992 | Oushiden et al. |
| 5,581,344 | A | 12/1996 | Makita |
| 5,709,377 | A | 1/1998 | Yoshioka et al. |
| 5,717,977 | A | 2/1998 | Suzuki et al. |
| 5,961,226 | A | 10/1999 | Nishida |

FOREIGN PATENT DOCUMENTS

| EP | 0 398 661 A2 | 11/1990 |
| EP | 0 872 779 A2 | 10/1998 |

*Primary Examiner*—Fred L. Braun
(74) *Attorney, Agent, or Firm*—Frishauf, Holtz, Goodman & Chick, P.C.

(57) ABSTRACT

An image forming apparatus is provided which is capable of forming images on recording materials of various types and sizes. The image forming apparatus includes a storing member for storing recording materials having an arbitrary size, a size-information input device for inputting size information corresponding to the arbitrary size of the recording materials, and a controller for controlling an image forming operation according to the size information inputted by the size-information input device. The size information input by the size-information input device includes each of arbitrary values corresponding to longitudinal and lateral lengths of the recording materials.

8 Claims, 15 Drawing Sheets

FIG. 14

SET A TYPE AND A SIZE OF A SPECIAL SHEET.

SPECIAL SHEET TYPE

- THICK SHEET
- THIN SHEET
- TABULATION SHEET
- OHP
- MOTHER PRINT
- DESIGNATED SHEET

SIZE

- REGULAR SIZE
- REGULAR SPECIAL SIZE
- NON-REGULAR SIZE
- WIDE SHEET

A5W
A4W
A3W
5.5×8.5W
8.5×11W
11×17W

SIZE INPUT

STANDARD SIZE

◀ ▶

123mm×65mm

IMAGE POSITIONING

LEADING EDGE

CENTERING

JOB 10

OK

CANCEL

SELECTED DOCUMENT SIZE: PRIMARY SCANNING → 210mm
SUB-SCANNING → 410mm

ARBITRARY SET SIZE: PRIMARY SCANNING → 220mm
SUB-SCANNING → 426mm

X1 : 220mm   X2 : 210mm   X3 : 2mm   X4 : 8mm
Y1 : 426mm   Y2 : 410mm   Y3 : 2mm   Y4 : 14mm

SELECTED REGULAR SIZE: A3

ARBITRARY SET SIZE: PRIMARY SCANNING → 304mm (+6mm)
　　　　　　　　　　　SUB-SCANNING → 426mm (+6mm)

X1 : 324mm　　X2 : 297mm　　X3、X4 : 3mm
Y1 : 426mm　　Y2 : 420mm　　Y4 : 6mm

SELECTED REGULAR SIZE: A3

ARBITRARY SET SIZE: PRIMARY SCANNING → 304mm (+6mm)
　　　　　　　　　　　SUB-SCANNING → 426mm (+6mm)

X1 : 304mm　　X2 : 297mm　　X3、X4 : 3mm
Y1 : 426mm　　Y2 : 420mm　　Y3、Y4 : 3mm

SELECTED REGULAR SIZE: A3

ARBITRARY SET SIZE: PRIMARY SCANNING → 299mm (+2mm)
                    SUB-SCANNING → 420mm (+0mm)

X1 : 299mm    X2 : 297mm    X3、X4 : 1mm
Y1 : 420mm    Y2 : 415mm    Y3 : 2mm    Y4 : 3mm

IMAGE FORMING APPARATUS CAPABLE OF FORMING IMAGES ON RECORDING MATERIALS OF VARIOUS TYPES AND SIZES

This is a Continuation of application Ser. No. 09/732,349 filed on Dec. 7, 2000, now abandoned.

BACKGROUND OF THE INVENTION

The present invention relates to an image forming apparatus, and in particular, to an image forming apparatus wherein workability in forming images on recording materials of various types and sizes has been improved.

As a conventional image forming apparatus, there has been provided an image forming apparatus in which an image is formed on a transfer sheet (recording material) feds from a sheet feed cassette. To be more concrete, those recognized as an image forming apparatus include a copying machine in which a document is placed on or fed to a platen glass, and images of characters or patterns written or drawn on the document or of a combination thereof are copies on the aforesaid transfer sheet, a printer in which images similar to the foregoing formed on a word processor of a personal computer, for example, are printed on the transfer sheet, and a facsimile machine in which images similar to the foregoing transmitted through communication lines are printed.

In the image forming apparatus of this kind, it is not necessary to supply transfer sheets from outside each time, and it is possible to form continuously the images stated above on a relatively large quantity of transfer sheets, because the sheet feed cassette is provided and a plurality of transfer sheets can be stored in the sheet feed cassette in advance.

Further, there has already been available an image forming apparatus that is provided with a plurality of sheet feed cassettes, and in this case, it is possible to prepare in advance transfer sheets in plural types in terms of size and type.

Incidentally, even when transfer sheets having specific type and size are prepared in advance for each sheet feed cassette as stated above, there have been the following problems in the conventional image forming apparatus. Namely, when forming images on transfer sheets each having different type and different size, control conditions for the total image forming apparatus, namely, sheet conveyance condition and process condition usually need to be changed for each type and size. In the past, however, when forming images on a sheet of a specific type and a sheet of a specific size, the changes of the aforesaid conditions have been made by the method to cope with the condition change by conducting operations such as "mode setting" specially on all such occasions prior to image forming. Therefore, in the case of coping with the transfer sheet that is different from a transfer sheet called an ordinary sheet usually, operations of the image forming apparatus are time-consuming and are generally complicated, thus, there have been problems in its workability. When using the transfer sheet of a specific type or one having a specific size in a bypass feed tray, complicated operations of mode setting like those stated above must be conducted in addition to placing the transfer sheet on the bypass feed tray, which has extremely worsened workability.

For example, when forming images on a transfer sheet that is in "irregular size" in terms of transfer sheet size, it has been necessary to select "irregular size input mode" capable of inputting longitudinal and lateral sizes of the transfer sheet and to input the aforesaid conditions, prior to conducting image forming. On this point, in particular, when it is considered that a user using "irregular size" is frequently in the state to form images always on the irregular size, it is possible to assert that mode setting conducted each time as stated above is extremely problematic on the point of efficiency.

Further, there has been an occasion to conduct image forming for "irregular size" in a simpler way wherein transfer sheets other than those in regular size are grouped together equally by the handling of "special size" and by applying finally to them equally the control condition concerning, for example, "maximum size". However, this method is far from the optimum image forming, resulting in problems.

Further, even in the case where the type is different, it has been necessary to establish, for example, a mode of "thick sheet", a mode of "thin sheet" and "an applied mode" that is more general, and to input information necessary for determining the aforesaid control condition from an established image plane concerning the mode concerned prior to image forming, which is basically the same as the occasion about "size".

SUMMARY OF THE INVENTION

The invention has been achieved in view of the circumstances stated above, and its object is to provide an image forming apparatus wherein its workability is excellent when conducting image forming on a transfer sheet that is of a specific type or in a specific size.

To solve the subjects and problems mentioned above, the invention has taken the following structures.

An image forming apparatus for forming images on a recording material characterized in that a plurality of recording material storing members each storing the recording materials are provided, and each of the recording material storing members is provided with an input means that establishes establishment information of a type and/or non-regular size of the recording material stored in the recording material storing member.

In this case, "non-regular size" means sizes other than "regular size" (including, for example, A4, A3, B5, B4, 8.5×11 inch and 11×17 inch, and each of them takes a longitudinal type and a lateral type). Though a recording material wherein at least its length in the conveyance direction (hereinafter referred to as "longitudinal direction") does not accord with the length in the longitudinal direction of the regular size can be established as the non-regular size, it is more preferable that a recording material wherein a length in the longitudinal direction does not accord with the length in the longitudinal direction of the regular size and a length in the direction perpendicular to the conveyance direction (hereinafter referred to as "lateral direction") does not accord with the length in the lateral direction of the regular size either is established as the non-regular size. Further, "regular size" in a concrete means is a regular size with which a regular size detection section can detect which of a plurality of regular sizes corresponds to the size of the recording material. For example, in Japanese and European specifications, A4, A3, B5 and B4 are called the "regular size", while in the American specifications, 8.5×11 inch and 11×17 inch are called the "regular size", and regular sizes other than the foregoing are called the "special regular size" (representing 8.5×11 inch and 11×17 inch in Japanese and European specifications and A4, A3, B5 and B4 in the American specifications). However, even in the case of Japanese and European specifications, for example, if the regular size detection section is arranged to be capable of detecting 8.5×11 inch, it is a regular size. The wording simply expressed as "size" in the present specifications means both "non-regular size" and "regular size".

With regard to "type", control conditions (conveyance conditions and process conditions) in an image forming apparatus usually need to be changed at need for improvement of image quality and for optimization of an image forming process, and this "type" includes both "ordinary sheet" (in the embodiment, recycled sheet, colored sheet, quality sheet and peelable sheet are handled as an ordinary sheet because the control conditions for them are the same as those for the ordinary sheet, and if some of them are different from the ordinary sheet in terms of control conditions, they can be handled as "special sheet" for distinguishing them from the ordinary sheet) and "special sheet) (in the embodiment, the special sheet includes thick sheet, thin sheet, mother print, tabulation sheet and OHT, and control conditions for them are different from those for the ordinary sheet, and the control conditions are different from each other).

Further, "input section" is an operation section (touch panels and buttons) provided on an image forming apparatus, and it may also be set from a computer through a network (for example, LAN) to which the image forming apparatus is connected, and in this case, the input section is one (for example, a controller section such as a network interface) connected to the network, and the computer is a setting section.

An image forming apparatus characterized in that there is provided a setting mode that conducts image forming under the control conditions in accordance with the aforesaid setting information set on a recording material storing member in which the recording material is stored when forming images on the recording material. An image forming apparatus characterized in that the recording material storing member is equipped with a type detecting section that detects a type of the stored recording material and/or a regular size detection section that detects which regular size among plural regular sizes corresponds to the size of the recording material, and there is provided a detection mode that conducts, when forming images on a recording material, the image forming under the control condition in accordance with the type detected by the type detection section and/or the regular size detected by the regular size detection section. An image forming apparatus characterized in that a selection section that selects either one of the setting mode and the detection mode is provided.

"Selection section" in this case is an operation section (touch panels and buttons) provided on an image forming apparatus, and it may also be set from a computer through a network (for example, LAN) to which the image forming apparatus is connected, and in this case, the selection section is one connected to the network, and the computer is a setting section. The "selection section" may either be located at a position which is different from that for the "input section" or be located at the same position to be used also as the "input section".

An image forming apparatus characterized in that, when the setting information is not set in the recording material storing member when forming images under the condition of the setting mode, image forming is conducted under the detection mode. An image forming apparatus characterized in that, when the regular size detection section detects the regular size that does not correspond to the non-regular size in the case where the non-regular size is set as the aforesaid set information set in the recording material storing member, image forming is conducted under the detection mode.

In this case, "detecting the regular size that does not correspond to the non-regular size" means the occasion wherein the regular size detection section detects the regular size other than the smallest regular size among regular sizes greater than non-regular size established as setting information, or the occasion wherein the regular size detection section detects the regular size other than the greatest regular size among regular sizes smaller than non-regular size established as setting information.

An image forming apparatus characterized in that a bypass feed tray on which a recording material can be placed is provided, and the input section sets setting information of the type and/or non-regular size of the recording material placed on the bypass feed tray.

An image forming apparatus characterized in that a bypass feed setting image plane for inputting the setting information concerning the recording material placed on the bypass feed tray is displayed on an operation section, for conducting image forming on the recording material placed on the bypass feed tray.

An image forming apparatus characterized in that it is possible to select whether or not to indicate the bypass feed setting image plane on the operation section, when conducting image forming on the recording material placed on the bypass feed tray.

An image forming apparatus characterized in that, when an automatic recording material selection function for selecting the recording material storing member that stores a recording material whose size accords with a size of a document from a plurality of recording material storing members and/or an automatic sheet storing member switching function for selecting other recording material storing members storing recording materials whose size is the same as that of the recording material when recording materials are gone on the half way of image forming is provided, selection by the automatic recording material selection function and/or the automatic sheet storing member switching function is prohibited for the recording material storing member on which the aforesaid setting information wherein a special sheet is designated as a type is set.

In this case, "a size of a document" means a size of a document that is read by an image reading device provided on the image forming apparatus, or a size of image data (document) transmitted from a computer through a network (for example, LAN) to which the image forming apparatus is connected.

An image forming apparatus characterized in that selection by the automatic recording material selection function and/or the automatic sheet storing member switching function is prohibited for the recording material storing member on which the setting information where non-regular size or a wide sheet is designated is set.

An image forming apparatus characterized in that setting is conducted, in the input section, by an input of a length in the longitudinal direction and a length in the lateral direction relating to the non-regular size and/or by an input of a difference from a regular size, when setting the non-regular size in the setting information.

An image forming apparatus characterized in that the setting information stated above is stored in a non-volatile storing section for each recording material storing member.

An image forming apparatus for forming images on a recording material characterized in that there are provided a recording material storing member storing recording materials that is constituted to be taken in an apparatus main body when forming images and to be drawn out of the apparatus main body when replenishing recording materials, and an input section that sets setting information of a type and/or a non-regular size of a recording material stored in the recording material storing member for that recording material storing member.

An image forming apparatus for forming images on a recording material under the control conditions in accordance with a type and/or a size of a recording material characterized in that a recording material storing member that stores recording materials, a type detection section that detects a type of a recording material stored in the recording material storing member and/or a size detection section that detects a size of the recording material and an input section that establishes setting information of a type and/or a size of a recording material stored in the recording material storing member are provided, and there are provided a setting mode in which image forming is conducted under the control conditions in accordance with the above-mentioned setting information that is set in the recording material storing member storing the recording material and a detection mode in which image forming is conducted under the control conditions in accordance with a type detected by the type detection section and/or a size detected by the size detection section.

An image forming apparatus characterized in that the size detection section is a regular size detection section that detects which regular size corresponds among a plurality of regular sizes.

An image forming apparatus characterized in that a selection section that selects either one of the setting mode and the detection mode is provided.

An image forming apparatus for forming images on a recording material under the control conditions in accordance with a type and/or a size of a recording material characterized in that there are provided a recording material storing member that stores recording materials, a type detection section that detects a type of a recording material stored in the recording material storing member and/or a regular size detection section that detects which regular size corresponds to the size of the recording material among a plurality of regular sizes, and an input section that sets on the recording material storing member the setting information composed at least of a type and/or a size of a recording material stored in the recording material storing member, and warning is given when the type detected by the type detection section and/or the regular size detected by the regular size detection section does not accord with the type and/or the size in the setting information.

An image forming apparatus characterized in that image forming is prohibited when the type detected by the type detection section and/or the regular size detected by the regular size detection section does not accord with the type and/or the size in the setting information.

An image forming apparatus characterized in that image forming is conducted under the control conditions in accordance with the type detected by the type detection section and/or the regular size detected by the regular size detection section when the type detected by the type detection section and/or the regular size detected by the regular size detection section does not accord with the type and/or the size in the setting information.

An image forming apparatus for forming images on a recording material characterized in that there are provided a recording material storing member storing recording materials that is constituted to be taken in an apparatus main body when forming images and to be drawn out of the apparatus main body when replenishing recording materials, a bypass feed tray on which a recording material can be placed, and an input section that sets setting information of a type and/or a size of the recording material stored in the recording material storing member, and when forming images on the recording material placed on the bypass feed tray, a bypass feed setting image plane that sets setting information of a type and/or a size of the recording material placed on the bypass feed tray is displayed on an operation section, in advance to the image forming.

An image forming apparatus characterized in that the establishment of the setting information by the input section is conducted in a controller setting mode.

An image forming apparatus for forming images on a recording material characterized in that a plurality of recording material storing members each storing recording materials are provided, and a non-volatile storing means that stores setting information of a type and/or a non-regular size of a recording material stored in each recording material storing member is provided for each of the recording material storing members.

An image forming apparatus comprising: a storing member for storing recording materials having an arbitrary size; a first input device for inputting a size information corresponding to the arbitrary size of the recording materials; and a controller for controlling an image forming operation according to the size information inputted by the first input device.

An image forming apparatus comprising: a plurality of storing members for storing recording materials classified in various kinds of classes, each of the storing members storing the recording materials classified in a designated class; a second input device for inputting classification information of each of the designated classes of the recording materials, wherein each of the classification information is allocated to each of the storing members; a controller for controlling an image forming operation according to each of the classification information inputted by the second input device.

BRIEF DESCRIPTION OF THE DRAWINGS

Other objects and advantages of the present invention will become apparent upon reading the following detailed description and upon reference to the drawings in which:

FIG. 14 is a diagram showing a bypass feed setting image plane (wide sheet, size selection) in an operation/display section;

DETAILED DESCRIPTION OF THE PREFERRED EMBODIMENT

Figure 1:
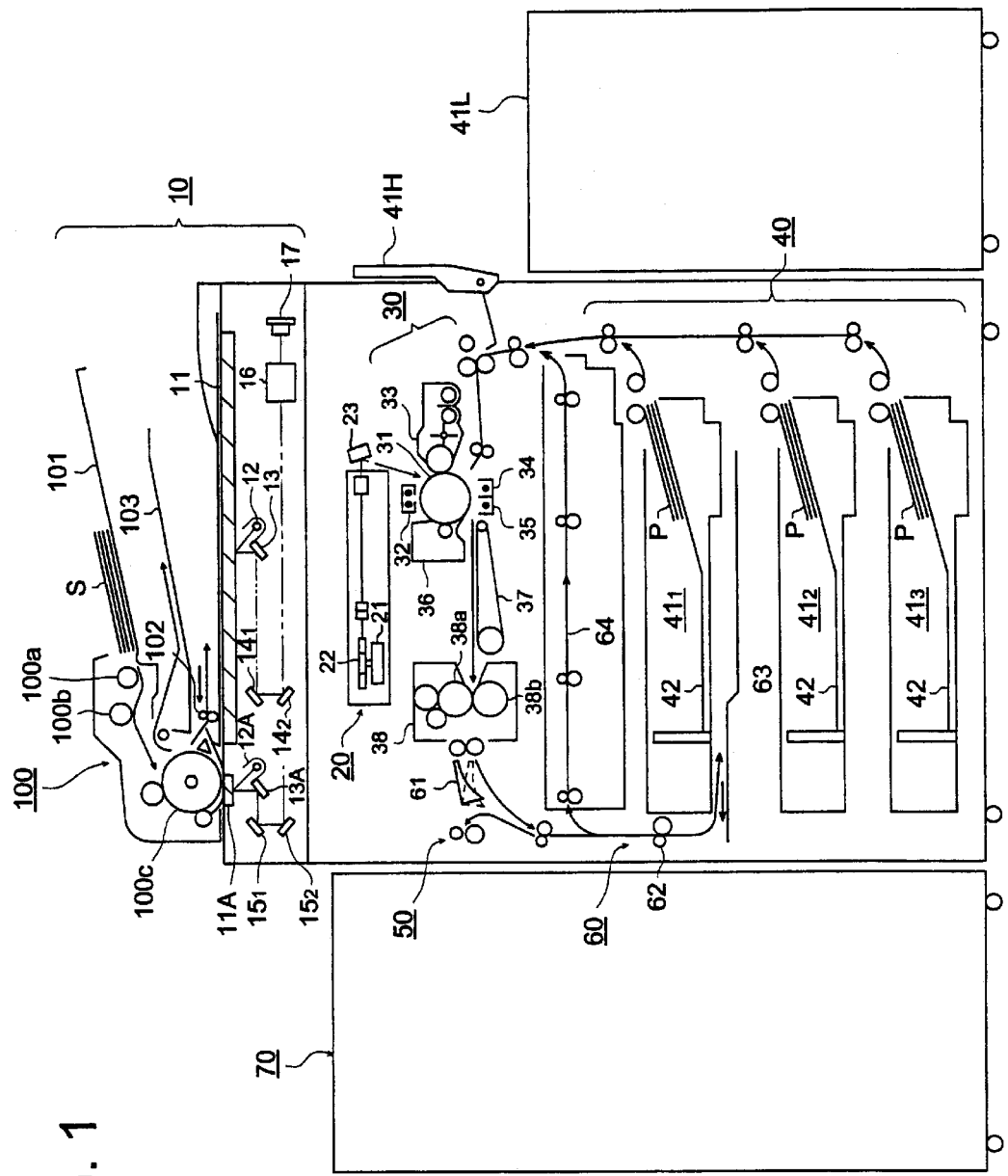
FIG. 1 is a schematic diagram showing an example of the structure of an image forming, apparatus relating to the present embodiment.

An embodiment of the invention will be explained as follows, referring to the drawings. FIG. 1 is a schematic diagram showing an example of the structure of an image forming apparatus relating to the present embodiment. In FIG. 1, an image forming apparatus is roughly composed of image reading section, image writing section 20, image forming section 30, transfer sheet conveyance section 40, transfer sheet ejection section 50 and transfer sheet reversing section 60, and further, outer sheet feed means 41L and copy finishing section 70 are provided to be mounted on the apparatus main body. Incidentally, "a transfer sheet" mentioned in the present embodiment corresponds to "a recording material" mentioned in the invention.

The image reading section 10 is a section which reads characters or patterns described on document S with light emitted from a light source as optical information, and converts them into electrical information.

The document S is placed directly on platen glass 11 so that the document surface on which images are formed face the surface of the platen glass (document glass) 11. Light source 12 projects light on the document surface on which images are formed. Light arriving at the document surface turns into light (information) including information of images on the document surface and is reflected on that surface to arrive at mirror 13. Incidentally, light source 12 and mirror 13 are arranged to be capable of moving along platen glass 11 to scan the entire document surface on which images are formed.

Further, the image forming apparatus in the present embodiment is equipped with automatic two-sided document conveyance section (RADF) 100 serving as an automatic document feeding means from which the document S can also be fed onto platen glass 11A. The automatic two-sided document conveyance section 100 is arranged so that a sheet of a group of plural documents S laminated on document placing stand 101 is separated to be fed out by feed rollers 100a and 100b, and is supplied onto platen glass 11A through roller 100c. Light source 12A and mirror 13A are at a standstill below the platen glass 11A (in this case, the light source 12A and the mirror 13A move toward the left side in FIG. 1 to be at a standstill). Due to these constitution, document surfaces can be read continuously with regard to a group of plural documents S, in the same way as in the foregoing.

In addition to the foregoing, it is also possible to read two sides including the surface and the revers of document S, in the constitution of the automatic two-sided document conveyance section 100 and platen glass 11A shown in FIG. 1. In this case, document S whose one side is irradiated by light source 12A is fed out toward the right side in the diagram by reversing roller 102 temporarily, and after the reading is completed, rotation of the reversing roller 102 is reversed, thus, the document S is conveyed by roller 100c so that the other side of the document S may face the surface of platen glass 11A while the document S is being conveyed toward, the left side in the diagram. Incidentally, the document S supplied from the automatic two-sided document conveyance section 100 and is irradiated by light source 12A is laminated successively on sheet ejection tray 103.

Further, in the image reading section 10, there is provided a document size detection means that conducts automatic detection of a document size. This document size detection means corresponds to a plurality of optical document size sensors 18 provided below platen glass 11 and to a document size detection section (not shown) for RADF. The former is a document size detection means that is used when a document is placed directly on the platen glass 11, while the latter is a document size detection means that is used when the automatic two-sided document conveyance section 100 is used.

Figure 2:
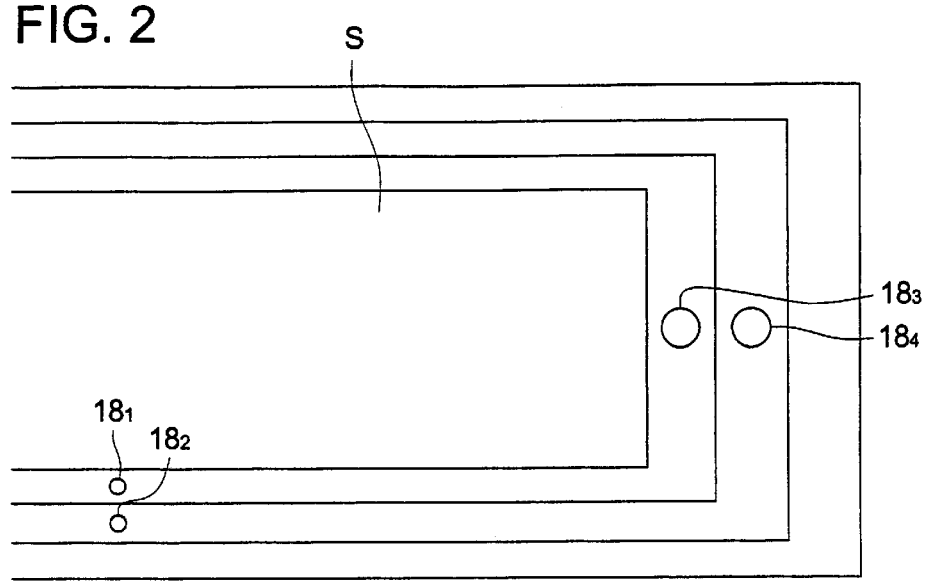
FIG. 2 is an illustration showing a document size detection means (optical document size sensor) in an image reading section of the image forming apparatus shown in FIG. 1.

As shown in FIG. 2, the optical document size sensor 18 is composed of sensors $18_1$ and $18_2$ which detect a document size in the primary scanning direction (direction perpendicular to the page in FIG. 1) representing the vertical direction in the drawing, namely a document width, and of sensors $18_3$ and $18_4$ which detect a document size in the sub-scanning direction (direction from side to side in FIG. 1) representing the direction from side to side in the drawing, namely a document length. Each of the sensors $18_1, \ldots, 18_4$ is composed of a pair of a light-emitting element and a light-receiving element which are not illustrated. Now, when document S in a certain size is placed on platen glass 11, a set of combinations in terms of light detection are produced between an occasion where all beams from light-emitting elements in the four sensors $18_1, \ldots, 18_4$ are intercepted by the document S and an occasion where all beams are detected even when the document S is placed. By examining the combinations of sensors $18_1, \ldots, 18_4$ based on existence of light detection, a size of document S can be detected automatically, The document size detection section for RADF is composed of a side regulating plate (not shown) provided on document placing stand 101 and a timer sensor (not shown) that measures a period of time for a document to pass in the sub-scanning direction. A size of document S can be detected automatically, when the side regulating plate detects its own position (document width direction) when it is brought into close contact with a side of a group of documents S placed on the document placing stand 101, and when calculation is made from the period of time for a document to pass and its conveyance speed both measured by the timer sensor (document length detection).

The size of document S detected automatically by these optical document size sensor 18 and the document size detection section for RADF is utilized when APS function described later is carried out. Incidentally, this detection of a document size is to detect which regular size among a plurality of regular sizes corresponds to the document size.

Now, the optical information relating to document surface Sf irradiated by light sources 12 or 12A as stated above is reflected repeatedly on mirrors $14_1$ and $14_2$ or $15_1$ and $15_2$ and arrives at CCD image-pickup device 17 through image forming optical system 16. The CCD image-pickup device 17 representing the image-pickup section has thereon photoelectric surface (not shown) on which a plurality of pixels each having photoelectric transfer function are arranged in a one-dimensional way (in the primary scanning direction representing the direction perpendicular to the page in FIG. 1), and optical information including image information on the document surface are received by these plural pixels and are converted into electric information (which is also called image data).

The image writing section 20 is a section which projects (writing) a laser beam modulated based on the image data (image data subjected to image processing such as shading correction or Y correction, and it may sometimes be one stored in an image memory (not shown) obtained through the foregoing on photoreceptor drum 31 described later and thereby forms an electrostatic latent image on the photoreceptor drum 31.

The aforesaid electric information (image data) including image information obtained by converting optical information on the document surface is used for modulating a laser beam emitted from an unillustrated semiconductor laser. The laser beam modulated based on the image data stated above and emitted is projected on polygon mirror 22 whose central portion is connected to driving motor 21 to be made capable of rotating, and the laser beam reflected on the polygon mirror is projected on photoreceptor drum 31 through reflection mirror 23. In this case, when the polygon mirror 22 rotates while it is reflecting the laser beam, scanning on the photoreceptor drum 31 in its axial direction (primary scanning direction) is conducted by irradiation by the laser beam. Due to this irradiation by the laser beam, an electrostatic latent image based on the electric information is formed on the photoreceptor drum 31.

Incidentally, when the image forming apparatus is connected to a network (for example, LAB), it is also possible to form an electrostatic latent image on the photoreceptor drum 31 by projecting (writing), on photoreceptor drum 31 described later, the laser beam modulated based on image data (document) transmitted from a computer through the network.

The image forming section 30 is a section where an image is formed on transfer sheet P based on an electrostatic: latent image formed on the photoreceptor drum 31.

An entire surface of the photoreceptor drum 31 is charged electrically by charging section 32 as a preliminary work before an electrostatic latent image is formed on the photoreceptor drum 31 through irradiation by a laser beam as stated above. In developing section 33, charged toner particles are stuck to the electrostatic latent image so that it is visualized. Namely, a toner image based on the electrostatic latent image is formed. In transfer section 34, toner particles forming the toner image are transferred and stuck to the surface of transfer sheet P conveyed to the transfer section separately, and thereby, an image is formed on the surface of the transfer sheet P.

After that, for the photoreceptor drum 31 and thereon, separation section 35 separates transfer sheet P stuck to the photoreceptor drum 31, and cleaning section 36 removes toner remaining on the photoreceptor drum 31 after the transfer operation to create the cleaned surface, so that uniform charging may be conducted by the charging section 32 and an electrostatic latent image may be formed by irradiation with a laser beam again. On the other hand, the transfer sheet P is sent to fixing section 38 through conveyance mechanism 37. In the fixing section 38, heat and pressure are applied to the transfer sheet P by heat rollers 38a and 38b, and thereby, the toner particles transferred are fixed. After this, the transfer sheet P is ejected to the outside of the image forming apparatus through several rollers provided on transfer sheet ejection section 50. At this point of time, "copying" of images concerning document surface on the surface of transfer sheet P is completed.

Incidentally, in the image forming apparatus of the present embodiment, the transfer (namely, image forming) of toner particles from the photoreceptor drum 31 to transfer sheet P can be carried out not only for one side but also for the other side of the transfer sheet P. In this case, the transfer sheet P finished in terms of copying on its one side is conveyed to transfer sheet reversing section 60. Guide section 61 switches a conveyance path for transfer sheet P between the transfer sheet reversing section 60 and the transfer sheet ejection section 50. When the guide section 61 switches so that transfer sheet P is conveyed downward in the diagram, the transfer sheet P is fed out to reversing section 63 through reversing roller 62. Then, under the state wherein the transfer sheet P is fed out toward the reversing section 63 by a predetermined quantity, the reversing roller 62 is reversed to convey the transfer sheet P to reversed conveyance path 64. After that, the transfer sheet P passes through the path 64 and arrives again at the upstream side of the photoreceptor drum 31. In this case, the surface of the transfer sheet P facing the photoreceptor drum 31 is one opposite to the surface subjected to transfer before passing the transfer sheet reversing section 60. Incidentally, in general, when forming images actually on the transfer sheet P reversed as stated above, new image information is written on the photoreceptor drum 31 by the image writing section 20 in advance.

Transfer sheet conveyance section 40 is a section which conveys transfer sheet P to the image forming section 30, especially to its photoreceptor drum 31.

Transfer sheets P are stored in a plurality of sheet feed cassettes (recording material storing means) 41 constructed stepwise vertically (three sheet feed cassettes $41_1$, $41_2$ and $41_3$ in the drawing), and are concretely stacked and placed on tray (bottom plate) 42 provided on each of sheet feed cassettes 41. These sheet cassettes are constituted to be taken in an apparatus main body when sending transfer sheet P to the image forming section 30, namely when forming images, and to be drawn out of the apparatus main body when replenishing transfer sheets P. Further, with regard to each of the sheet feed cassettes $41_1$, $41_2$ and $41_3$, it is possible to store transfer sheets P in various sizes in accordance with classification of sizes such as storing "A4" in the first sheet feed cassette $41_1$ and storing "A3" in the second sheet feed cassette $41_2$, or it is possible to store in accordance with classification of types such as storing thick sheets in A4 size in the first sheet feed cassette $41_1$ and storing thin sheets in the same size in the second sheet feed cassette $41_2$. Incidentally, sheet feed cassettes $41_1$–$41_3$ in the present embodiment can store transfer sheets P in various sizes, and they are sometimes called "universal cassette".

Incidentally, though FIG. 1 shows an occasion wherein three sheet feed cassettes are provided, the number of sheet feed cassettes which can be provided is not limited in principle in the invention. Namely, sheet feed cassettes in any number can be provided.

In the present embodiment, bypass feed tray 41H and outer sheet feed means (so-called LCT) 41L are provided as transfer sheet conveyance section 40, and in addition to sheet feed cassette 41, there are provided, as a means to place (store) transfer sheet P to be fed, bypass feed tray 41H and a sheet feed tray (not shown) in outer sheet feed means 41L in which a large number of transfer sheets P can be stocked in advance, as shown in FIG. 1. The former makes it possible to cope with an occasion where image forming on a special transfer sheet or on an OHP is conducted in particular, while, the latter makes it possible to conduct continuous image forming for a large quantity of transfer sheets P.

In the present embodiment like this, when setting information of a size and a type of transfer sheet P is designated in the course of execution of image forming, transfer sheet P is fed out of the corresponding sheet feed cassettes $41_1$–$41_3$, bypass feed tray 41H or a tray in outer sheet feed means 41L, in accordance with the designation, and the transfer sheet P is conveyed toward the image forming section 30 by the structure of a plurality of conveyance rollers shown in FIG. 1. Hereafter, the sheet feed cassettes $41_1$–$41_3$, bypass feed tray 41H and a tray in outer sheet feed means 41L are sometimes called a storing member generically, and in that case, the storing member having a symbol of $41_1$–$41_3$ means a sheet feed cassette, the storing member having a symbol of 41H means a bypass feed tray and the storing member having a symbol of 41L means a tray in outer sheet feed means 41L.

Copy finishing section 70 is a section wherein finishing processing is given to the transfer sheet P on which an image has been formed after the transfer sheet P has passed through the transfer sheet conveyance section 40 and image forming section 30 (and also transfer sheet reversing section 60 in the case of two-sided copying).

To be concrete, the copy finishing section 70 conducts various types of processing such as sorting, stapling and punching for transfer sheet P on which an image has been formed. Sorting in this case means processing to arrange transfer sheets P ejected successively in the desired order, or to stack them in accordance with the aforesaid order. For example, when using the automatic two-sided document conveyance section 100, an occasion to make a plurality of sets for a group of transfer sheets P wherein the order of sheets is the same as the stacking order for each sheet of document S constituting a group of documents S placed on document placing stand 101, corresponds to the aforesaid "desired order".

On the other hand, the stapling means operations to position a stapler at the prescribed location on a plurality of stacked transfer sheets P on which images have been formed and to bind the transfer sheets P. Further, the punching means operations to make a hole for a binding string at a prescribed position on a plurality of stacked transfer sheets P, in place of positioning a stapler in the aforesaid stapling P, (hole may also be made before stacking).

Figure 3:
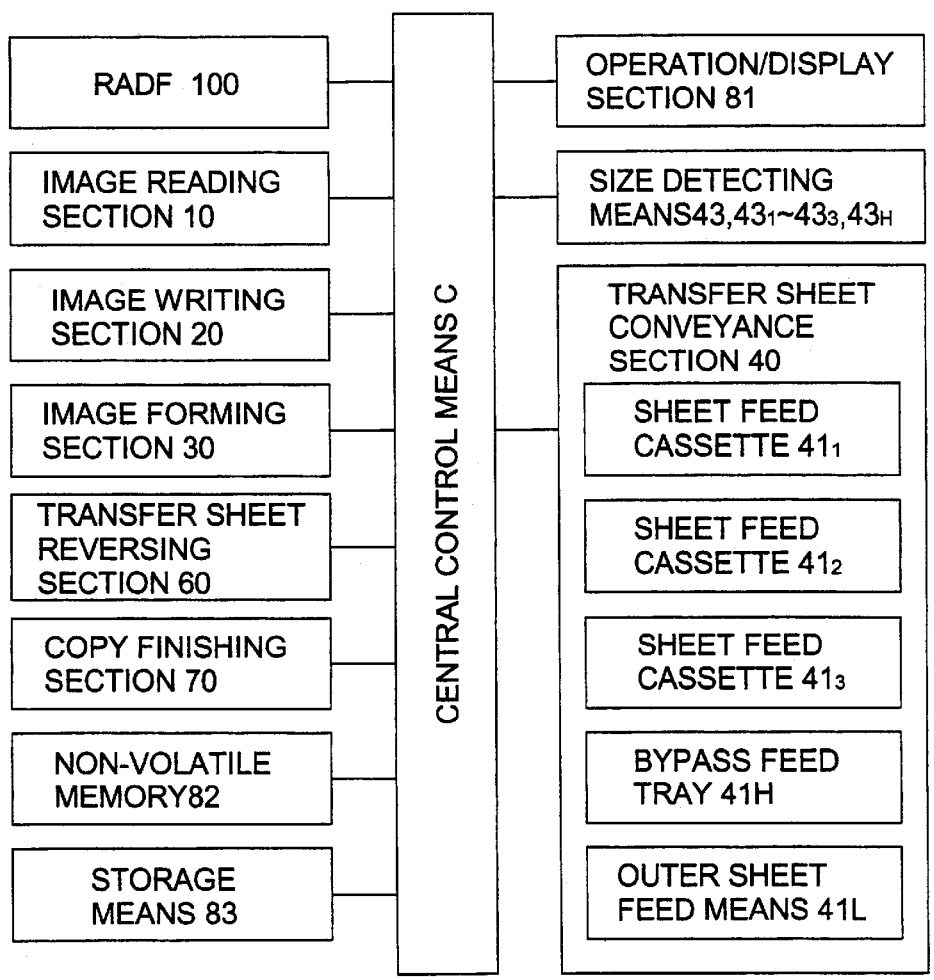
FIG. 3 is a schematic diagram showing an example of the electrical structure of an image forming apparatus relating to the present embodiment.

Next, with regard to the image forming apparatus representing an example of the mechanical structure explained above in detail, an example of electrical structure of the image forming apparatus will be explained as follows, referring to FIG. 3. In FIG. 3, the image forming apparatus relating to the present embodiment is arranged so that various types of mechanisms in the aforesaid RADF 100, image reading section 10, image writing section 20, image forming section 30, transfer sheet conveyance section 40, transfer sheet reversing section 60 and copy finishing section 70 are generalized and controlled.

Size detection means $43_1$–$43_3$, and $43_H$ (hereinafter referred to also as size detection means 43) represent a detection means that detects a size of transfer sheet P stored in each of sheet feed cassettes $41_1$–$41_3$ and bypass feed tray $43_H$, and it is provided on each of sheet feed cassettes $41_1$–$41_3$ and bypass feed tray $41_H$. With regard to the structure of the size detection means 43, it is possible to use those which are known, and in short, it is a means to detect a size in the lateral direction and a size in the longitudinal direction of transfer sheet P. Information obtained by the size detection means 43 is inputted in central control means C. Based on the obtained information (a lateral size and a longitudinal size of transfer sheet P), the central control means C judges which of plural regular sizes corresponds, and detects the regular sizes of transfer sheets P stored in sheet feed cassettes $41_1$–$41_3$ and bypass feed tray $41_H$. Detection of regular size by these size detection means 43 and central control means C constitutes a regular size detection section. "Regular size" here is a size which can be detected as a size of a recording material by a regular size detection means among a plurality of regular sizes. For example, A4, A3, B5 and B4 are called "regular size" in Japanese and European specifications, while, 5.5×8.5 inch and 8.5×11 inch are called "regular size" in the American specifications, and regular sizes other than the foregoing are called "special regular size" (representing 5.5×8.5 inch and 8.5×11 inch in Japanese and European specifications and A4, A3, B5 and B4 in the American specifications). However, even in the case of Japanese and European specifications, for example, if the regular size detection section is arranged to be capable of detecting 8.5×11 inch, it is a regular size. Incidentally, sizes which include "special regular size" and exclude the "regular size" are called "non-regular size", and the "non-regular size" is divided into "special regular size", "irregular size" and "wide sheet" as described later.

Incidentally, in the present embodiment, outer sheet feed means 41L is not provided with a size detection means, and non-volatile setting (direct setting to the non-volatile storage means by serviceman mode) is used when the outer sheet feed means 41L is installed by a serviceman. However, it is also possible to provide a size detection means, in the same way as in the sheet feed cassette 41.

In general, operation/display section 81 is composed of a touch panel wherein an operation section on which a user indicates operation timing such as start and stop of copying and conducts setting of various operation environment and a display section on which the state of operations of the image forming apparatus and the state of setting are displayed are united solidly, and this operation/display section 81 is controlled by central control means C. Further, the image forming apparatus may also be connected to a network (for example, LAN) so that setting of operations may be conducted from a computer through the network, thus, information established by the computer is inputted in the image forming apparatus from the section (for example, a controller section such as a network interface) where the image forming apparatus is connected with the network.

Figure 4:
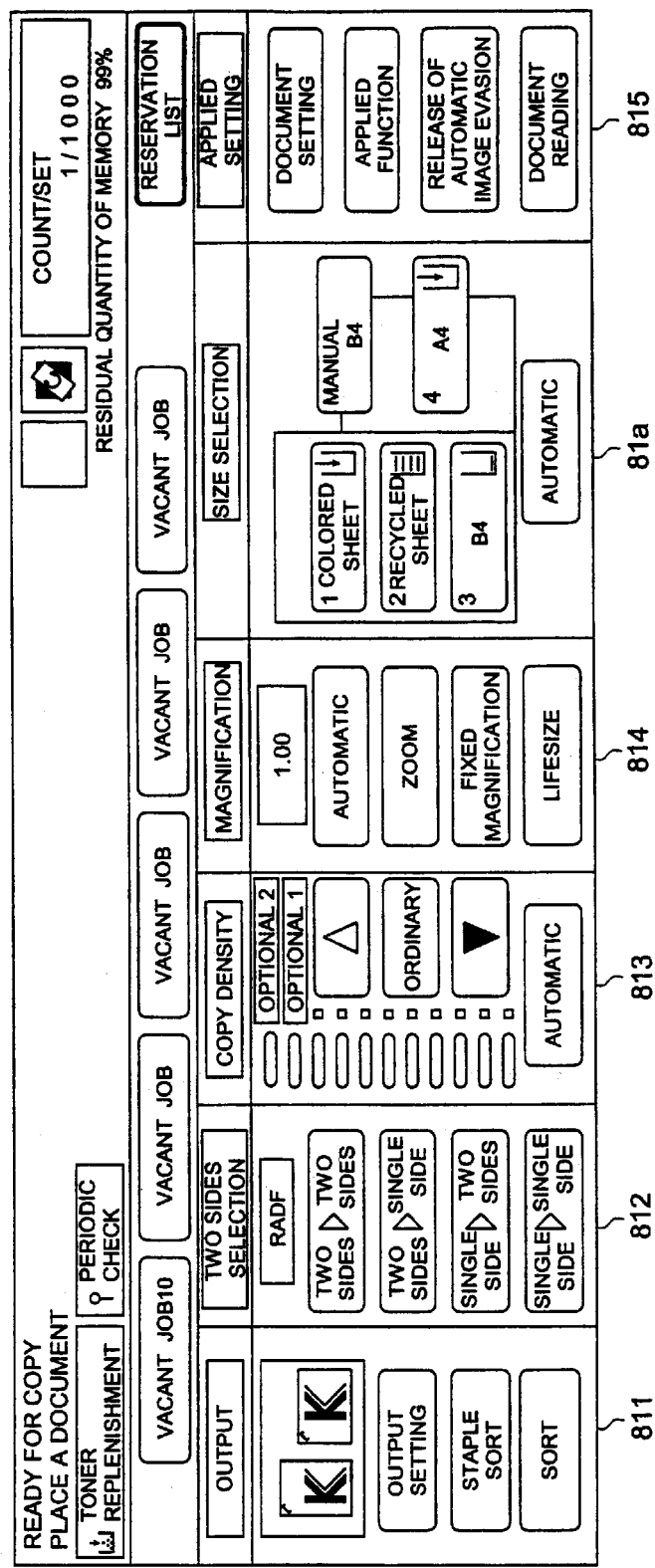
FIG. 4 is a diagram showing a basic image plane in an operation/display section.

A concrete example of the basic image plane displayed on the operation/display section 81 is illustrated in FIG. 4.

In FIG. 4, when an icon shown in each of areas 811–815 and in 81a is pressed, a prescribed information input relating to setting of JOB such as the setting of operation environment is conducted, and various operations concerning the image forming apparatus can be carried out.

In more detail, designation about how to output transfer sheet P after completion of copying, especially about the aforesaid copy finishing section 70 is conducted in area 811, and automatic two-sided document conveyance section 100 in image reading section 10 and the state of image forming (two-sided or single-sided for document S and transfer sheet P) are set on area 812. Further, copy (image forming) density is set on area 813, copy magnification is set on area 814, selection of transfer sheet P on which images are formed is set on 81a and various types of applied setting illustrated are set on area 815.

In the basic image plane, when the "automatic" button on area 81a is selected, it means that there is selected an automatic recording material selection function hereinafter referred to also as APS) which selects a storing member storing transfer sheet P having a size that accords with a size of document S detected automatically by an optical document size sensor 18 or by RADF document size detection section from a plurality of storing members $41_1$–$41_3$ and 41L. Further, when the "automatic" button is selected on area 814 and either one of storing members $41_1$–$41_3$, 41H and 41L other than "automatic" button is selected on area 81a, it means that there is selected an automatic magnification selection function (hereinafter referred to also as AMS) which changes magnification automatically so that the size of document S detected automatically by the optical document size sensor 18 or by RADF document size detection section may accord with a size of transfer sheet P stored in the selected storing member. Further, in the image forming apparatus in the present embodiment, there is provided an automatic sheet feed switching function (hereinafter referred to also as ATS) that selects another storing member storing transfer sheet P whose size is the same as that of the transfer sheets P which are in process of image forming and are gone from the storing member on the half way of image forming for the set quantity of copies.

Incidentally, in area 81a, "1", "2", "3" and "4" show respectively storing members "$41_1$", "$41_2$", "$41_3$" and "41L", and "manual" shows bypass feed tray 41H.

In the basic image plane in FIG. 4, when an operator sets the number of sheets for image forming through a quantity setting button (ten-key) that is not shown in FIG. 4 after setting the image forming, and then, presses a copy button that is not shown in FIG. 4 either, copying is started.

Now, the area 81a will be explained in detail. In the area 81a, an icon corresponding to each sheet feed cassette 41 is displayed as shown in FIG. 4, and information relating to a type and a size of transfer sheets P stored in each sheet feed cassette are displayed. It is understood in FIG. 4 that a type is set to "colored sheet" and a size is set to "A4" for sheet cassette 411, for example.

In the present embodiment, information concerning "type" of transfer sheet P stored in each of storing members $41_1$–$41_3$ and 41L is provided to be set on each of storing members $41_1$–$41_3$ and 41L from the operation/display section.

This setting is conducted by a controller (since a copying machine in the present embodiment is a high speed machine having an image forming speed of 60 sheets/min or more, a person among users who controls this copying machine is sometimes appointed, and this person is called a controller) of a copying machine in the controller setting mode under which various types of setting are conducted. This controller setting mode can be switched by a password which is known only by a controller, and general users can not switch to this controller setting mode. In the controller setting mode, it is possible to set for various types of copying machines. As one of them, it is arranged, in the present embodiment, so that types and sizes of transfer sheets P stored in sheet feed cassette 41 can be set. When a controller presses a "sheet type/special size setting" button displayed on an image plane of the controller setting mode after witching to preceding controller setting mode, the image plane turns into one for setting types and sizes of transfer sheet P.

Sheet feed cassette 41 and outer sheet feed means 41L are displayed, and "1"–"3" show respectively sheet feed cassettes "$41_1$"–"$41_3$" and "4" shows outer sheet feed means "41L", thus, types of transfer sheet P set respectively are displayed. On the right side of the setting image plane, there are displayed types of transfer sheet P which can be set. This setting image plane is a type setting image plane for setting types of transfer sheet P, and a controller selects the sheet feed cassettes $41_1$–$41_3$ or outer sheet feed cassette 41L to be set by pressing the image plane corresponding to sheet feed cassettes $41_1$–$41_3$ or outer sheet feed cassette 41L to be set (upon selection, they are displayed on a black and white reversal basis). When "upward arrow" button for selecting types or "downward arrow" button is pressed on the right side of the setting images plane, the portion where the types are displayed (portion displayed on a black and white reversal basis) moves in succession, and when "OK" button is pressed at the position of the type which a controller wants to set, the selected type can be set on the tray.

With regard to "Types", the types that can be set, for example, are those shown in the following Table 1.

TABLE 1

| Target storing member | Sheet feed cassettes $41_1$, $41_2$ and $41_3$ Tray in outer sheet feed means 41 |
| --- | --- |
| Types to be set | Ordinary sheet (ordinary sheet, recycled sheet, colored sheet, special sheet, quality sheet and peelable sheet) Special sheet (thick sheet 1, thick sheet 2, thin sheet, OHP, mother print, user-designated sheet and tabulation sheet) |

Namely, the sheet types are roughly divided into "ordinary sheet" and "special sheet". The "ordinary sheet" mentioned in the present embodiment means a concept including a recycled sheet, a colored sheet, a special sheet, a quality sheet and a peelable sheet, in addition to the so-called general ordinary sheet. However, only basis for this classification is that control conditions (described later) for these five types of transfer sheets are the same as those for a general ordinary sheet in the present embodiment. Therefore, it is naturally possible to make the aforesaid control conditions for some of the five types of transfer sheets to be different from others. In other words, in the present embodiment, a recycled sheet, a colored sheet, a quality sheet and a peelable sheet are handled as an ordinary sheet because control conditions for them are the same as those for a general ordinary sheet, but if control conditions for a certain sheet of them are different from those for a general ordinary sheet, that sheet can be handled as a "special sheet" to distinguish it from "ordinary sheet". Further, the "special sheet" is a sheet of a "type" whose control conditions are different from those for "ordinary sheet", and thick sheet 1, thick sheet 2 (thicker than thick sheet 1), a thin sheet, OHP, a mother print, a user-designated sheet and a tabulation sheet are included in the special sheet. In the present embodiment, control conditions for each of these "special sheets" are different from others as described later.

Incidentally, in the present embodiment, the storing member on which "types" can be set are sheet feed cassettes $41_1$, $41_2$, $41_3$ and a tray in outer sheet feed means 41L as described in a column of the target storing member in Table 1. With regard to the "type" of transfer sheet P stored in the remaining bypass feed tray 41H, it is arranged so that the "type" is set by the bypass feed setting image plane each time before forming images on transfer sheet P on bypass feed tray 41H as described later, without being stored in storage section 83. This arrangement enhances workability in the occasion where a user wants to use a transfer sheet other than the transfer sheets which are stored in each storing member and are used in a higher frequency. However, it is also possible to arrange, depending on specifications, so that the type of transfer sheet P used on bypass feed tray 41H is also set with a controller setting mode and is stored in the same way as in other storing members. The foregoing also applies to the setting of "size" of transfer sheet P.

Then, the "type" thus set is stored in non-volatile storage means 83 for each of storing members $41_1$–$41_3$ and 41L.

In the present embodiment, information concerning "size" of transfer sheet P stored in each of storing members $41_1$–$41_3$ is provided to be set on each of storing members $41_1$–$41_3$ from the operation/display section.

Figure 5:
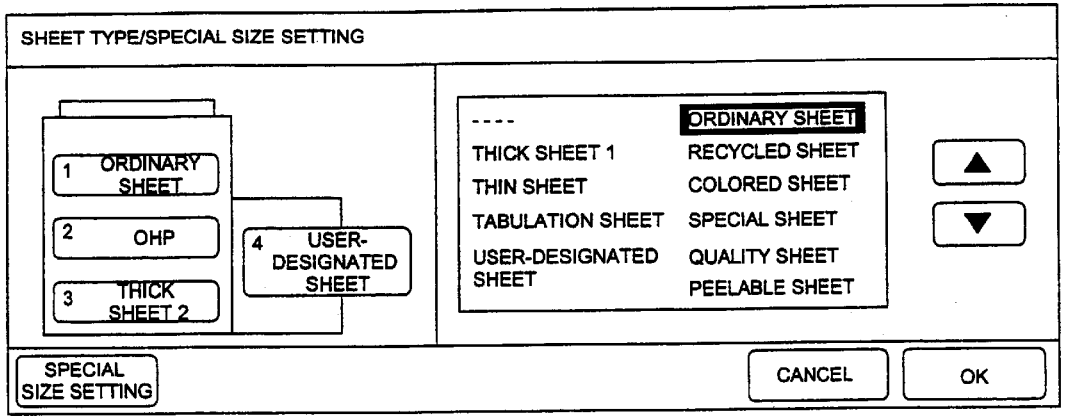
FIG. 5 is a diagram showing a sheet type setting image plane in an operation/display section.
Figure 6:
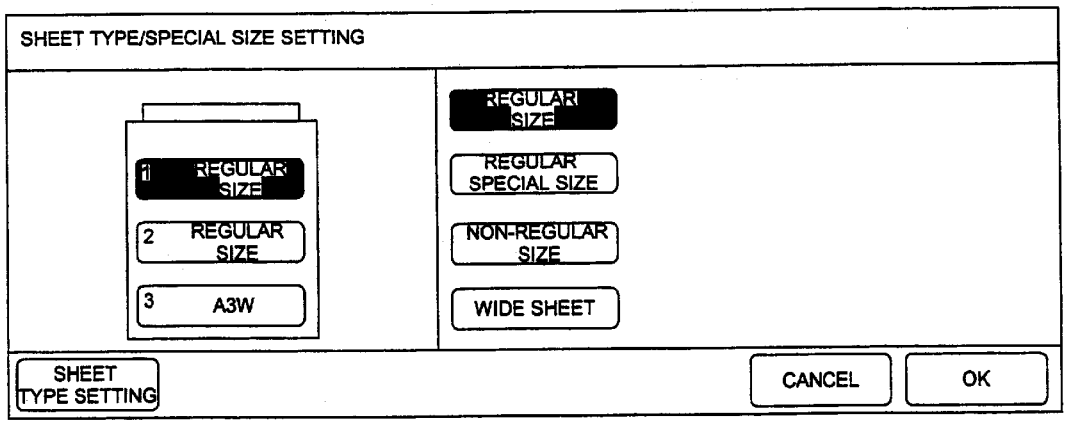
FIG. 6 is a diagram showing a special size setting image plane (regular size) in an operation/display section.
Figure 7:
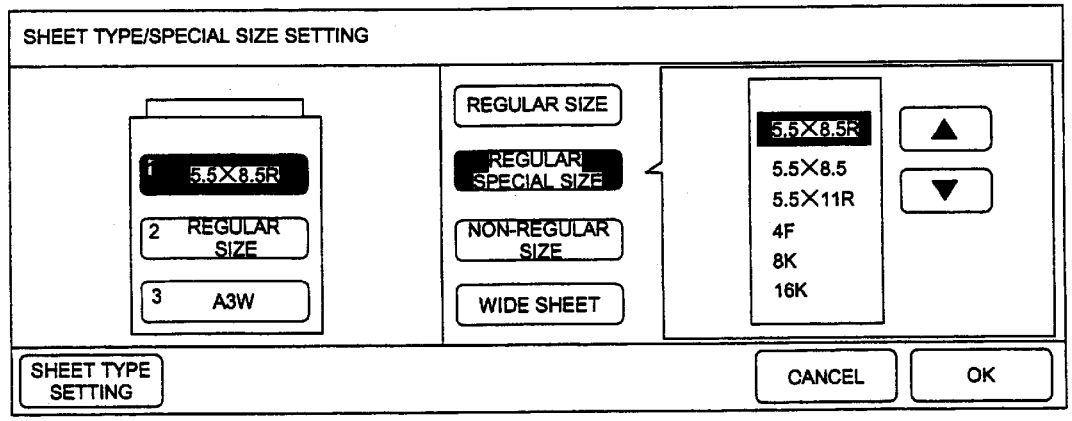
FIG. 7 is a diagram showing a special size setting image plane (regular special size) in an operation/display section.

When a controller presses a "special size setting" button displayed at the lower portion on the left side on the type setting image plane shown in FIG. 5, the image plane turns into one for setting a size of transfer sheet P (FIG. 6–FIG. 10). Namely, it is a size setting image plane in the controller setting mode as shown in FIG. 6, on which a size can be set for each of storing members $41_1$–$41_3$. On the left side of the setting image plane, there are respectively indicated sheet feed cassettes "$41_1$"–"$41_3$" so that they may correspond to "1"–"3", and sizes of transfer sheets P which are respectively set are displayed. On the right side of this setting image plane, there are indicated various sizes of transfer sheets P which can be set. This setting image plane is a size setting image plane for setting sizes of transfer sheets P, and a controller selects the sheet feed cassettes $41_1$–$41_3$ representing a target for setting by pressing the image plane corresponding to sheet feed cassettes $41_1$–$41_3$ to be set (upon selection, they are displayed on a black and white reversal basis). When an "upward arrow" button for selecting sizes which can be set including "regular size", "regular special size", "irregular size" and "wide sheet" or a "downward arrow" button is pressed on the right side of the setting image plane, the portion where the sizes are displayed (portion displayed on a black and white reversal basis) is moved in succession.

When "regular size" is selected (FIG. 6) in this case, a size (regular size) of transfer sheet P in sheet feed cassettes $41_1$–$41_3$ is detected by the regular size detection section, and the detected size (regular size) is used for selection of the control condition.

When "regular size" is selected in this case, it means that "detection mode" to conduct image forming under the control condition in accordance with the size detected by the regular size detection section is selected. On the other hand, when "regular special size" described later, "irregular size" and "wide sheet" are selected, it means that "setting mode" to conduct image forming under the control condition in accordance with the set information is selected. Namely, the image forming apparatus in the present embodiment has therein two modes including "detection mode" and "setting mode", and it is arranged so that either one of the two modes can be selected by operation/display section 81.

When "regular special size" is selected (FIG. 7), the special regular size which can be selected is displayed in a pop-up image plane on the right side of the "regular special size", and a special regular size that needs to be set is selected (displayed on a black and white reversal basis) from the displayed special regular sizes by pressing "upward arrow" button or "downward arrow" button.

When "irregular size" is selected (FIG. 8), the size input image plane is displayed as a pop-up image plane on the right side of the "irregular size", and a controller inputs a length of transfer sheet P (length in the sheet feeding direction) and a width (length in the direction perpendicular to the sheet feeding direction) by pressing directly ten-key ("0"–"9" buttons), an "upward arrow" button or a "downward arrow" button.

When "wide sheet" is selected (FIG. 9), sizes which can be set are displayed on a pop-up image plane. The "wide sheet" in this case is a transfer sheet whose length and/or width is slightly longer than a regular size (for example, 5 mm, 10 mm). Therefore, sizes which can be set and are displayed on the pop-up image plane is a regular size (including a special regular size in this case) (after which a symbol of W representing the wide sheet is added). Then, the desired size among the displayed sizes is selected by pressing an "upward arrow" button or a "downward arrow" button. Further, in the present embodiment, when a detailed size of the size needs to be changed, if "size input" button is pressed in FIG. 9, a size input image plane is displayed (FIG. 10). On this size input image plane, it is possible to set sizes of a length and a width of transfer sheet P with a ten-key or an arrow key. Incidentally, in FIG. 9, a "leading edge" button and a "centering" button represent a button for setting a position for image forming.

After setting a size for each of sheet feed cassettes $41_1$–$41_3$, when an "OK" button is pressed by a controller, the selected size can be set to the corresponding tray.

On the other hand, with regard to setting of a size of transfer sheet P stored in a tray in outer sheet feed means 41L, it is conducted by a serviceman by means of non-volatile setting (direct setting on a non-volatile storage means by a serviceman) when the serviceman install outer sheet feed means 41L, in the present embodiment. However, it is also possible to arrange so that the setting is conducted by a controller in the controller mode, in the same way as in the aforesaid sheet feed cassette 41.

Though an arrangement is made in the present embodiment so that a type and a size of transfer sheet P stored in each storing member can be set under the controller setting mode, it is also possible to arrange so that general users can set freely without designating the controller setting mode, without being limited to the present embodiment. However, users usually use several kinds of transfer sheets of special type and special size frequently. If this is taken into consideration, it is better to set a type and a size of a transfer sheet stored in each storing member under the controller setting mode, because it prevents confusion in use.

Then, the "size" thus set is stored in non-volatile storage means 83 for each tray of sheet feed cassettes 41$_1$–41$_3$ and outer sheet feed means 41L. Those stored in the storage means 83 in this case are non-regular sizes other than "regular size" (concretely, sizes set with "regular special size", "irregular size" and "wide sheet"). With regard to the "regular size", it is detected by a regular size detection section prior to image forming, but it is also possible to arrange so that it is detected in advance, and then is stored in the storage means 83.

In the present embodiment, when bypass feed tray 41H is selected on basic image plane (FIG. 4), a bypass feed setting image plane for setting the setting information ("type" and "size" as stated above) concerning transfer sheet P placed on the bypass feed tray 41H is displayed on operation/display section 81. Incidentally, it is also possible to arrange to display the bypass feed setting image plane prior to image forming, by detecting with an unillustrated sensor that transfer sheet P has been placed on bypass feed tray 41H, even when the bypass feed tray 41H is not selected directly on the basic image plane (FIG. 4). In short, the bypass feed setting image plane for inputting the setting information has only to be displayed, for conducting image forming on transfer sheet P placed on bypass feed tray 41H.

This bypass feed setting image plane is an image plane shown in FIGS. 11–14, and it is possible to conduct, on the bypass feed setting image plane, the setting which is basically the same as that on setting image planes (FIGS. 6–10) for transfer sheet P stored in sheet feed cassette 41. Incidentally, on the bypass feed setting image plane, "type" of transfer sheet P is represented by "thick sheet" (corresponding to "thick sheet 1" in FIG. 5), "thin sheet", "OHP", "mother print", "tabulation sheet" and "designated sheet" (corresponding to "user-designated sheet" in FIG. 5), and when none of them is selected, the sheet is handled as an "ordinary sheet".

When conducting image forming on bypass feed tray 41H in the present embodiment, the bypass feed setting image plane is displayed on operation/display section 81 as stated above. However, it is also possible not to display the bypass feed setting image plane. For example, in the controller setting mode or in the serviceman mode, it is possible to arrange to be capable of selecting whether to display the bypass feed setting image plane on operation/display section 81 when conducting image forming on transfer sheet P stacked on bypass feed tray 41L or not to display, and thereby not display the bypass feed setting image plane on operation/display section 81 when conducting image forming on transfer sheet P stacked on bypass feed tray 41L, if a controller or a serviceman has set not to display.

In FIG. 3, non-volatile memory 82 is a condition storage means on which the control condition for the image forming apparatus (conveyance conditions and process conditions) are stored, and central control means C controls each section based on the control conditions stored in the non-volatile memory 82. The control conditions are stored in the non-volatile memory 82 for each of "type" and "size" of transfer sheet P, and control conditions in accordance with the transfer sheet P to be conveyed are read to central control means C to be used for control. Namely, a size or a type of transfer sheet P stored in storage means 83 for each of sheet feed cassette 41 and outer sheet feed means 41L, or control conditions stored in non-volatile memory 82 in accordance with a size detected by size detection means 83 are read out and the whole of the image forming apparatus is controlled by central control means C.

The control conditions mentioned here mean the whole conditions which determine the mode of operations of the image forming apparatus such as process conditions and conveyance conditions, and more concretely, the control conditions represent revolving speed control conditions (namely, control of the so-called "linear speed") for various rollers in transfer sheet conveyance section 40 shown in FIG. 1, control conditions relating to temperature and a degree of pressure contact for heat rollers 38$a$ and 38$b$, and conditions determining operations and the state of various mechanisms in the whole image forming apparatus.

In the present embodiment, established values for control conditions are stored in, for example, non-volatile memory 82 in advance so that each different control condition may be selected depending on a difference of a type or a size of transfer sheet P. For example, depending on a difference of "type", control conditions as those shown in Table 2 below are prepared in advance.

TABLE 2

| Types | Switching of process control condition | Switching of height of guide to fixing unit | Inability of two-sided mode | Inability of staple mode, folding mode | Limited number of sheets set | Switching of display for remaining quantity | Limited to bypass feed |
|---|---|---|---|---|---|---|---|
| Thick sheet 1 | ∅ | ∅ | | | | ∅ | |
| Thick sheet 2 | ∅ | ∅ | ∅ | ∅ | | ∅ | |
| Thin sheet | ∅ | | | | | ∅ | |
| OHP sheet | ∅ | | ∅ | ∅ | ∅ | ∅ | ∅ |
| Mother print | ∅ | | | | | | ∅ |
| User-designated sheet | ∅ | | | | | | |
| Tabulation sheet | | | | ∅ | ∅ Ability of stapling | | |

As shown in Table 2 above, control conditions are switched in many ways depending on the type of thick sheet 1, thick sheet 2, thin sheet and OHP film. Incidentally, the expression of "thick sheet 1" and "thick sheet 2" means that the latter is thicker than the former.

Some brief statements about Table 2 are as follows. It is indicated that switching of "process control condition" on the leftmost column is conducted for all "types" excluding a tabulation sheet. This type of action is considered to be the most preferable one, because this action is taken for the intention to conduct the optimum copying for each "type". With regard to the column of "Height of guide to fixing unit" next to the leftmost column stated above on the right side, it shows that the control condition is switched from that for an ordinary sheet for thick sheet 1 and thick sheet 2. The reason for this is that the guide height regulated for the passage of an ordinary sheet adversely affects the passage of a thick sheet. The next column "Inability of two-sided mode" on the right side means that two-sided mode is impossible for thick sheet 2, an OHP film and a tabulation film. The reason for this restriction is that it is difficult to reverse the OHP film in the transfer sheet reversing section 60, two-sided copying on the OHP film is usually senseless, and there is possibility of sheet jamming caused by tabulation in the case of a tabulation sheet. In each column thereafter, there is prepared a control condition that is preferable for each "type", in the same way as in the foregoing.

For various "sizes", there are prepared in advance, for example, the control conditions shown in the following Table 3.

TABLE 3

| Regular size | Based on control specification for each size |
|---|---|
| Regular special size | Based on control specification for each size |
| | Warning by message when the size is different from one obtained from input information |
| Irregular size | To apply control specifications (conveyance conditions, in particular) of regular size representing the standard correspondingly |
| | Inability of two-sided mode |
| | Sheet ejection mode (sub-tray) |
| | Inability of APS/AMS/ATS functions |
| Wide sheet | To apply control specifications (conveyance conditions, in particular) of regular size representing the standard correspondingly |
| | Ability of selection of image forming position (positioning of leading edge, centering) |
| | Sheet ejection mode (ability for those other than staple mode) |
| | Inability of APS/AMS/ATS functions |

As shown in Table 3 above, control conditions are switched depending on the type of a regular special size, an irregular size and a wide sheet.

Control conditions in "regular size" in Table 3 can be determined in advance because of the just "regular size" (for example, "A4 size"). It is therefore possible to store control conditions concerning various regular sizes in non-volatile memory 82 in advance. "Regular special size" is a size such as, for example, 8.5×11 inch or 11×17 inch which is not usually used, although it is a regular size in foreign countries. Even for this, its control conditions can be determined in advance in the same way as in the foregoing, because it is a kind of regular size. Therefore, control conditions corresponding to each regular special size are stored in non-volatile memory 82 in advance.

On the other hand, for the "irregular size" and the "wide sheet", it is generally impossible to determine control conditions in advance, because the size of transfer sheet P is basically determined by a user freely as stated earlier. In this case, therefore, it is a basic condition to determine new control conditions each time based on the size of transfer sheet P that is set. These circumstances are indicated in the description saying that "To apply control specifications (conveyance conditions, in particular) of regular size correspondingly" in Table 3.

There will be explained operations in the occasion wherein control conditions are determined by setting information concerning "irregular size" and "wide sheet".

With regard to the "irregular size" and the "wide sheet", the size is basically set by a user freely as stated above, and therefore, the control conditions need to be determined to be appropriate each time in accordance with the free setting. The factors influencing on this determination are "sheet conveyance condition" and "image control condition" described below, in particular in the present embodiment.

First, With regard "sheet conveyance condition" concerning "irregular size" and "wide sheet", this is obtained by referring to "sheet conveyance condition" determined with respect to the regular size (hereinafter referred to as approximate regular size) that is smaller than a set value information of a feeding length (namely, the length in the "conveyance direction" or in the "longitudinal direction" stated above) relating to the established non-regular size and approximates most, and by adding correction value $\alpha$ to the "sheet conveyance condition". Namely, this is to cope with copying for a transfer sheet in "irregular size" and "wide sheet" representing an arbitrary size or an unknown size, by using the correction value $\alpha$ in accordance with circumstances. Incidentally, "to apply correspondingly" mentioned in the Table 3 above means a concept of processing such as existence of the correction value $\alpha$ and adding it.

To be more concrete, when determining the correction value $\alpha$ in a practical way for a transfer sheet in specific "irregular size" and "wide sheet", the following points are standards.

The following points are standards for determining the correction values $\alpha$ more concretely for the specific "irregular size" and "wide sheet" transfer sheets.

(1) PPM Control

With regard to PPM for "irregular size" and "wide sheet", a PPM interval equivalent to $\alpha$ is added to PPM for the approximate regular size. In this case, PPM (Print Per Minute) means the number of copies made in one minute for certain transfer sheet P. Therefore, an object of the addition of a PPM interval equivalent to $\alpha$ mentioned here is to make the condition between the trailing edge and the leading edge concerning sheet conveyance of transfer sheet P in the approximate regular size to be the same as that of transfer sheet P in the looked "irregular size" and "wide sheet", by adding $\alpha$ to the PPM for conveyance of the sheet in the approximate regular size.

(2) Feed Out Timing for the First Sheet in Continuous Sheet Feeding

On the setting timer for the approximate regular size, feeding out is delayed by an amount equivalent to $\alpha$. Namely, an addition corresponding to an amount equivalent to α is made on the setting timer. Again, an object of this condition setting is to make the condition between the trailing edge and the leading edge concerning transfer sheet P in the approximate regular size to be the same as that of transfer sheet P in the looked "irregular size".

It is understood that (1) and (2) above are related to control conditions about transfer sheet conveyance section 40 in FIG. 1.

(3) Setting Number of Circulating Sheets in a Reversing Path for Each Size (to be Used for ADU Circulation Judgment Control).

This is to correct the setting value of the number of transfer sheets capable of existing in the circulation path (reversing section 63 and reversing conveyance path 64) in the course of two-sided copying, by adding a circulation delay time equivalent to α to the set value for the approximate regular size.

(4) Changeover Timing of the Velocity of the Reversing Motor at the Time of a Reversing Operation An insufficient fixing delay time equivalent to α is added to the set value for the approximate regular size. This is to change the switching timing for the motor driving reversing roller 62 in the transfer sheet reversing section 60 stated above. In other words, the reason for the foregoing is as follows; transfer sheet P that is in an approximate regular size is different from transfer sheet P that is in a non-regular size in terms of timing to slip out of heat rollers 38a and 38b, and in accordance with that, therefore, it is necessary to change the switching timing for the reversing roller 62. Incidentally, this reversing of the reversing roller 62 is conducted even in the case of reversing and ejecting transfer sheet P, in addition to the occasion for conveying a transfer sheet to reversing conveyance path 64.

Incidentally, as operations/conditions or functions about an image forming apparatus which are of value for reference for determining correction value α, they can be considered naturally by adding conditions other than the aforesaid items (1)–(4). Further, in that case, a correction value (for example, β) other than α may be introduced. If the correction value α is to be considered only for the aforesaid items (1)–(4), it is enough to execute a definition of the length in the longitudinal direction when inputting setting information concerning "irregular size" and "wide sheet" (see FIG. 8–FIG. 10). However, it is preferable to set even in the lateral direction, in view of the situations that there may be the case where other conditions stated above are added.

Next, with regard to "image control condition" concerning "irregular size" and "wide sheet", it is a control condition concerning how to determine the image forming position for "irregular size" and "wide sheet" which are usually different from a document size. Namely, it is a control condition concerning the operation mode of the aforesaid image writing section 20 and image forming section 30. As an "image control condition" like one stated above, the condition described below and applied for the "irregular size" to control an image forming apparatus is different from that described below and applied for the "wide sheet".

Figure 8:
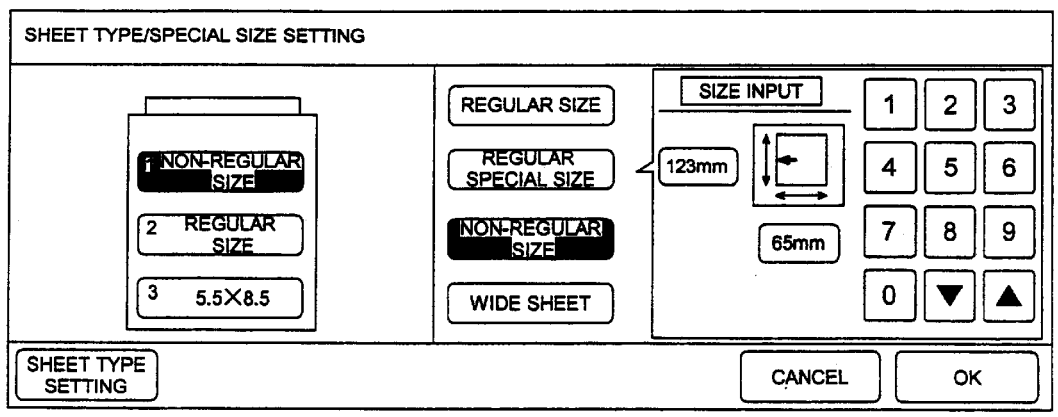
FIG. 8 is a diagram showing a special size setting image plane (irregular size) in an operation/display section.

First, with regard to the "irregular size", a control condition is determined as a range wherein an image in document size is formed on the reference of a side for transfer sheet P in size established voluntarily in FIG. 8, and margins (leading edge, trailing edge and both sides) stipulated in the basic specifications (determined voluntarily in advance) are secured in an image area.

Figure 15:
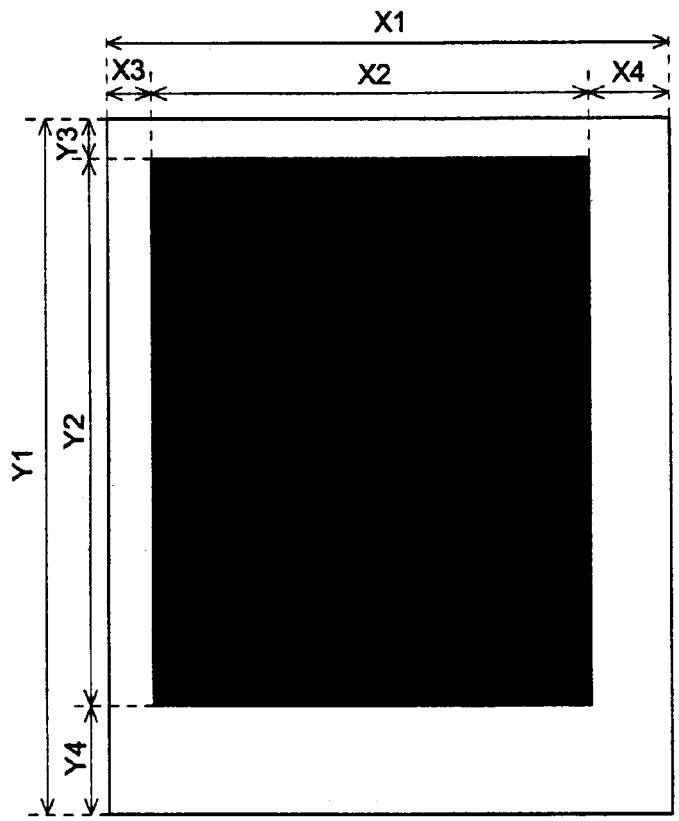
FIG. 15 is an illustration showing an example of image control conditions in the case where "irregular size" is selected concerning setting information "size"

For example, as shown in FIG. 15, under the assumption that the document size in the primary scanning direction is 210 mm (=x2) and that in the sub-scanning direction is 410 mm (=y2), while, the size of an irregular size transfer sheet established voluntarily in the primary scanning direction is 220 mm (=x1) and that in the sub-scanning direction is 426 mm (=y1), there are determined image control conditions to be 2 mm for the left edge (in the drawing, and so forth) x3, 8 mm for the right edge x4, 2 mm for the upper edge y3, and 14 mm for the lower edge y4.

Second, with regard to the "wide sheet", the control conditions are determined as follows through the selection concerning whether to select the leading edge positioning or to select a central position (centering). Incidentally, these leading edge positioning and centering are to be established in advance when conducting input of setting information for sheet feed cassette 41 by utilizing "Image Positioning" shown on the rightmost side in FIG. 9, which has been mentioned slightly.

(1) Leading Edge Positioning

Figure 9:
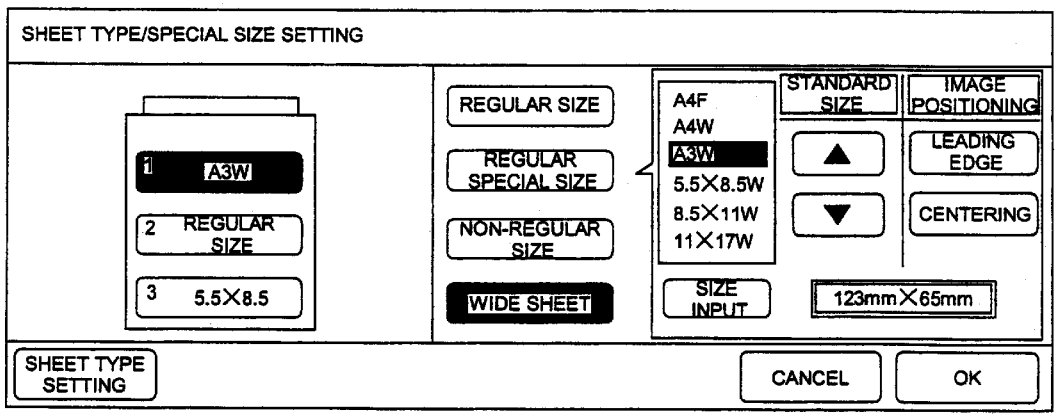
FIG. 9 is a diagram showing a special size setting image plane (wide sheet, size selection) in an operation/display section.
Figure 10:
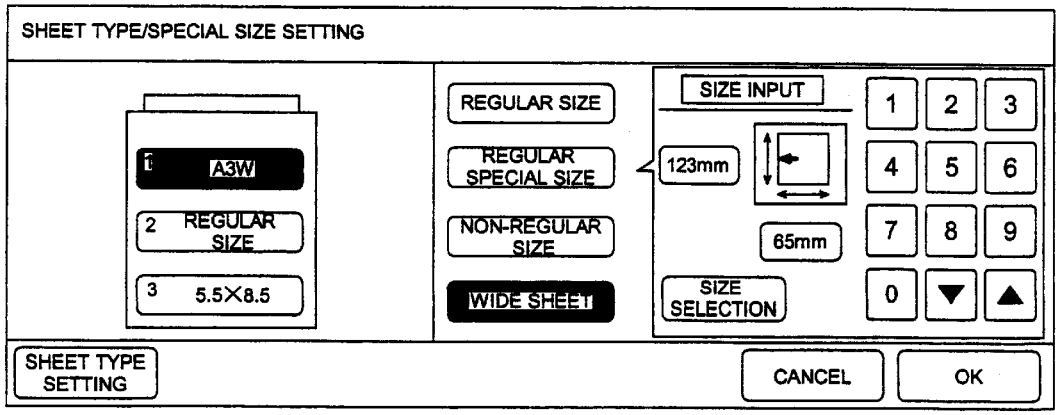
FIG. 10 is a diagram showing a special size setting image plane (wide sheet, size input) in an operation/display section.
Figure 11:
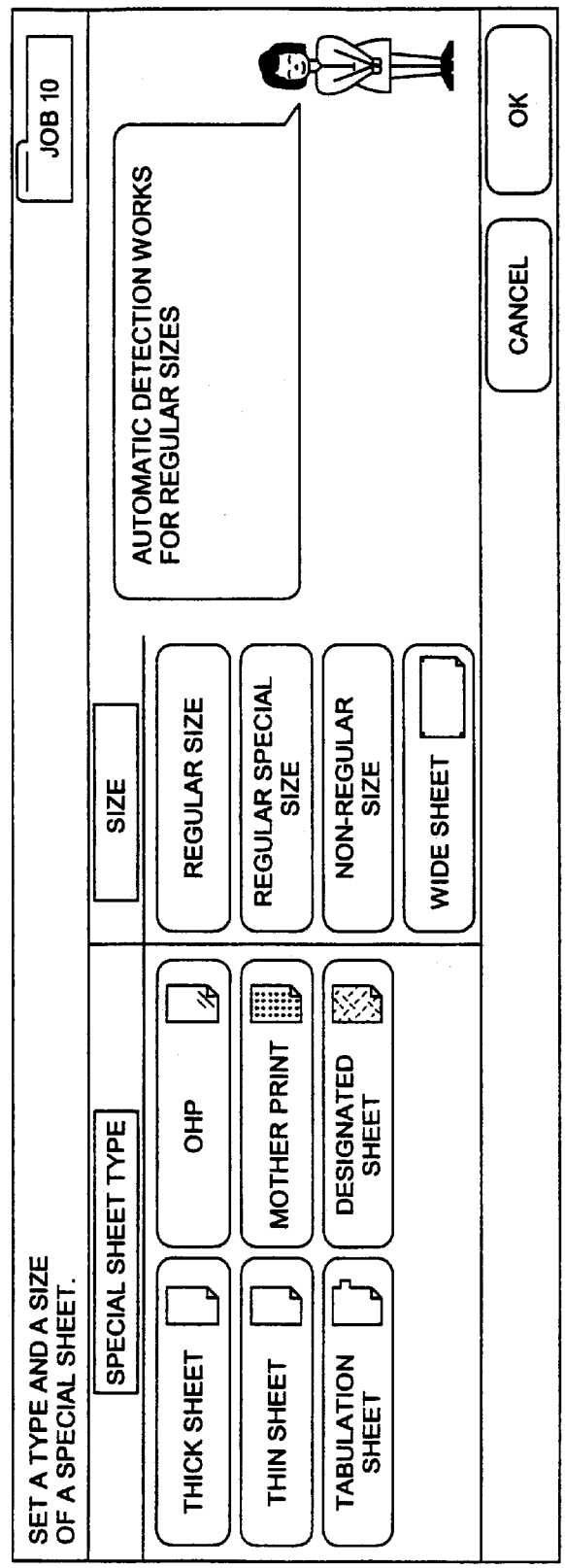
FIG. 11 is a diagram showing a bypass feed setting image plane (regular size) in an operation/display section.
Figure 12:
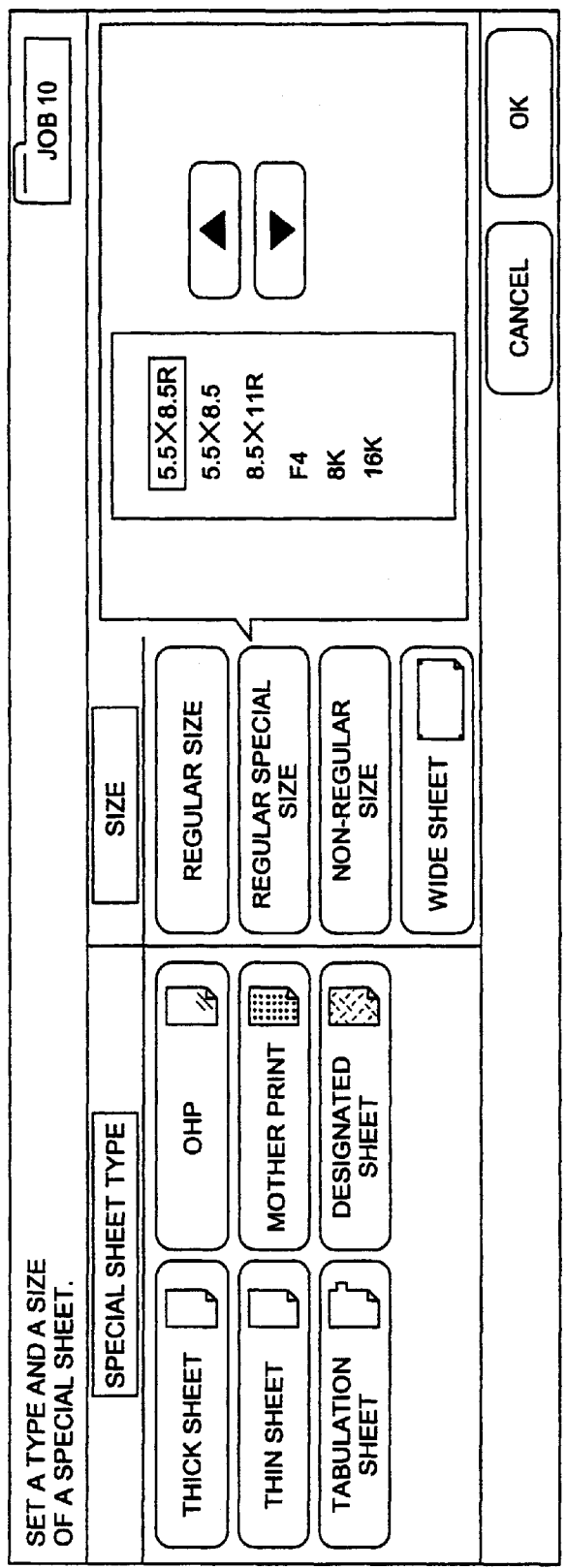
FIG. 12 is a diagram showing a bypass feed setting image plane (regular special size) in an operation/display section.
Figure 13:
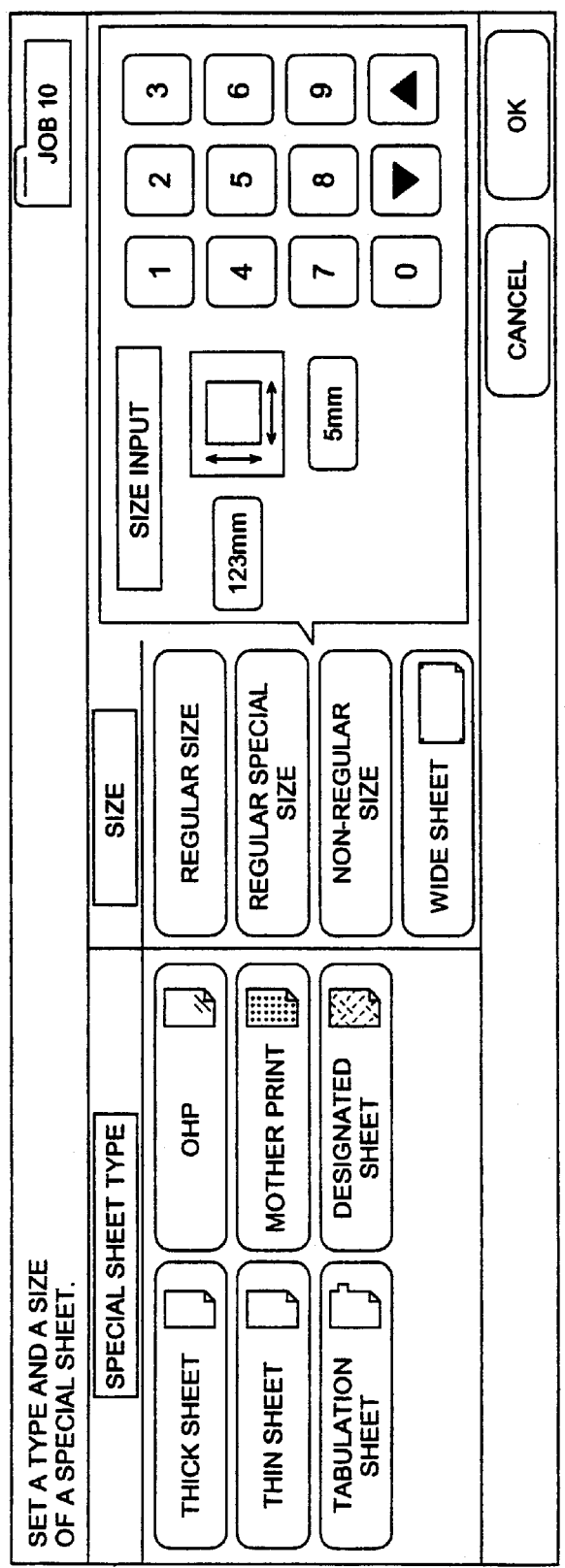
FIG. 13 is a diagram showing a bypass feed setting image plane (irregular size) in an operation/display section.
Figure 16:
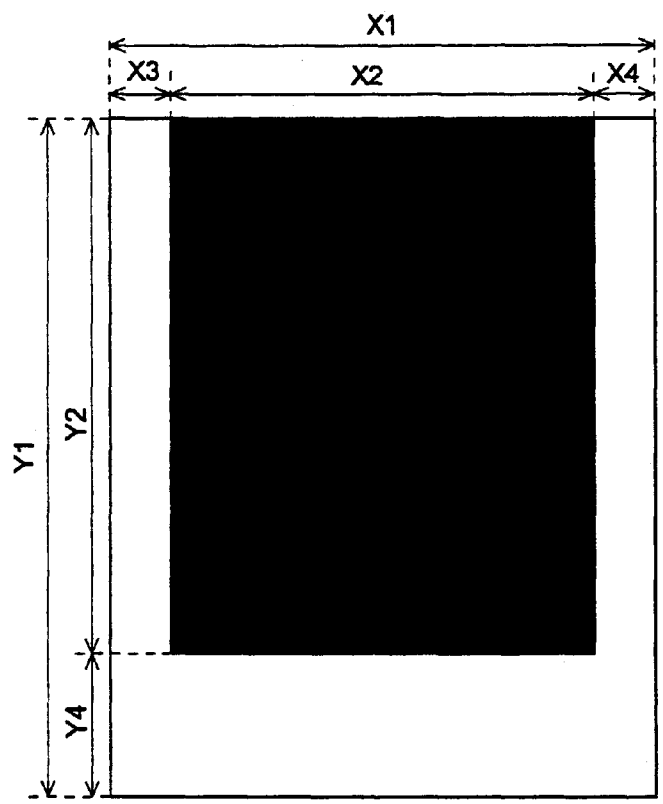
FIG. 16 is an illustration showing an example of image control conditions in the case where "wide sheet" is selected and "leading edge positioning" is selected, concerning setting information "size"

In the case of the leading edge positioning, an image in document size is formed through the leading edge positioning for transfer sheet P in wide sheet size set voluntarily, in FIG. 9. For example, when a size of a document is A3 as shown in FIG. 16, a size of a transfer sheet in wide sheet size established voluntarily is 304 mm in the primary scanning direction, and that in the sub-scanning direction is 426 mm, image control conditions are determined to be 3 mm for both the left edge x3 and right edge x4, and to be 6 mm for lower edge y4 and naturally 0 mm for the upper edge.

Incidentally, when conducting two-sided copying for the surface and reverse by utilizing transfer sheet reversing section 60 stated above, the conditions are determined so that image forming may be conducted in a way that when the leading edge positioning is selected on the surface on one side, "trailing edge positioning" is selected on the surface on the other side, so that the image forming position on the surface may agree with that on the reverse.

(2) Centering

In the case of the centering, an image in document size is formed to be positioned at the center, for transfer sheet P in wide sheet size set voluntarily, in FIG. 9. For example, in the case as shown in FIG. 17 which turns into the same state as in FIG. 16, image control conditions are determined so that each of the upper edge y3 and the lower edge y4 is 3 mm, and each of the left edge x3 and the right edge x4 is 3 mm.

Figure 17:
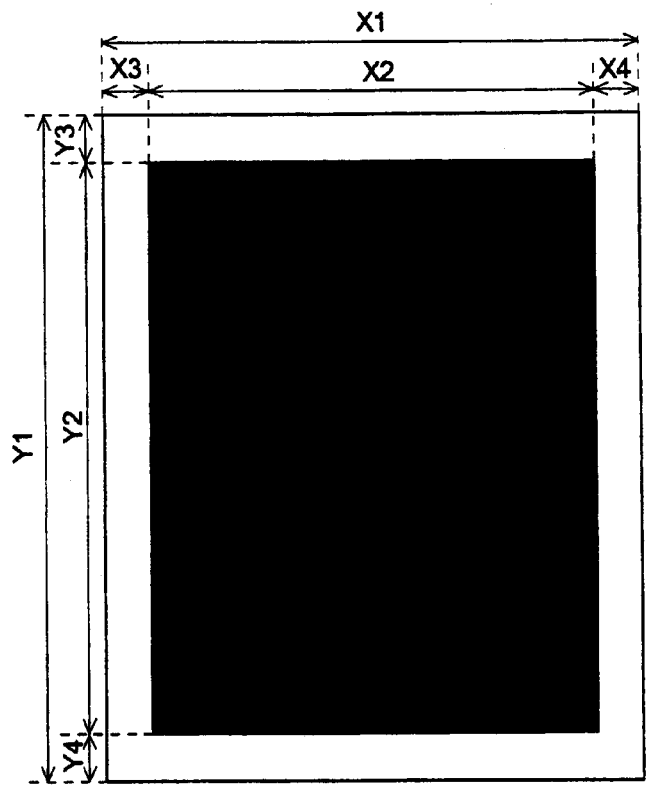
FIG. 17 is an illustration showing an example of image control conditions in the case where "wide sheet" is selected and "centering" is selected, concerning setting information "size"
Figure 18:
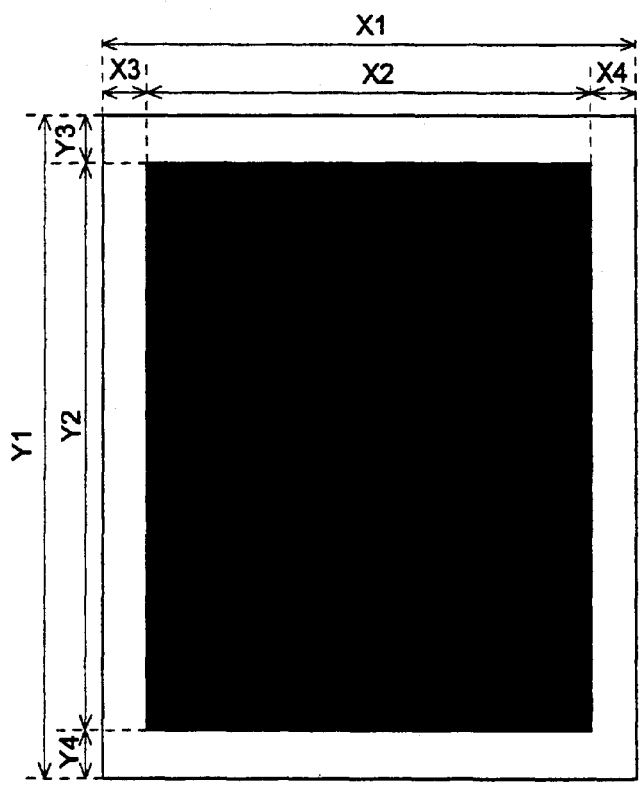
FIG. 18 is an illustration showing an example different from FIG. 13 of image control conditions in the case where "wide sheet" is selected and "centering" is selected, concerning setting information "size"

Further, in the case shown in FIG. 18 wherein a length in the primary scanning direction of a transfer sheet in a wide sheet size is 299 mm and a length in the sub-scanning direction is 420 mm, which is different from FIG. 17, image control conditions are determined so that upper edge y3 is 2 mm, lower edge y4 is 3 mm, and each of left edge x3 and right edge x4 is 1 mm.

As explained above, with regard to control conditions relating to sizes, it is required to establish control conditions of the image forming apparatus for its operations, while changing the control conditions relating to sizes extemporaneously in accordance with an arbitrary size set actually, by paying special attention to factors of "sheet conveyance conditions" and "image forming conditions".

Moreover, control conditions shown in Table 3 represent those which can be set in advance among control conditions having the natures stated above, and what is stored in non-volatile memory 82 is information concerning the aforesaid control conditions which can be set in advance.

Namely, in the case of "irregular size", the control conditions which can be set in advance and are shown below are stored in non-volatile memory 82.

(1) Two-sided copying utilizing the aforesaid transfer sheet reversing section 60 is impossible.

(2) A sheet ejection mode relating to the aforesaid transfer sheet ejection section 50 needs to be of a sub-tray (not shown) ejection.

(3) Each of APS function, AMS function and ATS function is prohibited.

Further, even in the case of "wide sheet", the control conditions which can be set in advance are stored in non-volatile memory 82, which is the same as the foregoing, and the following control conditions are stored in non-volatile memory 82.

(1) Setting of image control conditions concerning the position of image forming on transfer sheet P (the centering or the leading edge positioning stated above which is set in FIG. 9 or FIG. 14)

(2) A mode (stapling mode in Table 3) concerning execution of stapling in the aforesaid copy finishing section 70 is prohibited as an ejection mode, and other modes are not prohibited.

(3) Each of APS function, AMS function and ATS function is prohibited.

Incidentally, the "image control conditions" described in the item (1) will be explained again later.

Now, prohibition of APS function mentioned in item (3) will be explained for both the former and the latter in the aforesaid "irregular size" and "wide sheet".

APS function (automatic recording material selection function) in this case means a function to select automatically transfer sheet P having a size agreeing with a size of document S by means of size detection means 43 provided on sheet feed cassette 41 and a document size detection means that detects a size of document S (for example, the optical document size sensor 18) both provided, and to form images of the document S on the transfer sheet P, in the image forming apparatus preferably like that in the present embodiment equipped with a plurality of sheet feed cassettes 41 each being loaded with stacked transfer sheets P on which images are formed.

Further, when transfer sheets P in sheet feed cassette 41 storing the transfer sheets P are all gone in the course of continuous copying using the aforesaid APS function for a certain document size, for example, ATS function (automatic sheet feed switching function) in this case means a function to switch automatically to another sheet feed cassette 41 storing transfer sheets P in the same size provided that the another sheet feed cassette 41 exists.

Further, AMS function means a function to determine automatically the magnification and necessity of image rotation in image forming on transfer sheet P, for each size of document S, from a size of document S detected by the document size detection means and from a size of transfer sheet P selected to be used for copying in advance.

When executing these functions, each sheet cassette 41 is usually subjected to setting to find whether or not the setting corresponds to the function, as an assumption. In other words, when the APS function is executed, for example, it is necessary that the sheet feed cassette 41 that is an object for selection is subjected to "object setting".

From the foregoing, inability of APS function among control conditions for the sheet feed cassette 41 on which setting information of "irregular size" and "wide sheet" has been set shown in Table 3 can directly mean inability of the aforesaid "object setting". When the setting information as that described above has been set concerning the sheet cassette 41 which has already been subjected to object setting, the inability of APS function may mean that the object setting is canceled, and further, when the sheet feed cassette 41 as that described above is selected in the course of copying wherein the APS function is used, the inability of APS function may mean that the APS function is canceled. In any event, APS function, ATS function and AMS function are prohibited for the sheet feed cassette 41 on which the setting information of "irregular size" and "wide sheet" has been set.

Namely, the reason for the foregoing is that it is usually inappropriate to actualize object sheet feed cassette 41 in the course of execution of APS function, ATS function or AMS function, when the transfer sheet P is in "irregular size" or "wide sheet".

Incidentally, in connection with this, if differences of control conditions of the image forming apparatus in the present embodiment concerning the aforesaid APS/ATS/AMS functions are put in order in view of differences in "types", they result in those shown in Table 4 below.

TABLE 4

| Functions Setting information | APS | ATS | AMS |
|---|---|---|---|
| Types | | | |
| Ordinary sheet | ø | ø | ø |
| Thick sheet 1 | x | x | ø |
| Thick sheet 2 | x | x | ø |
| Thin sheet | x | x | ø |
| OHP | x | x | ø |
| Mother print | x | x | ø |
| User-designated sheet | x | x | ø |
| Tabulation sheet | x | x | ø |
| Sizes | | | |
| Regular size | ø | ø | ø |
| Regular special size | ø | ø | ø |
| Irregular size | x | x | x |
| Wide sheet | x | x | x |

ø: enable,
x: prohibited

It is understood from Table 4 that APS function and ATS function are prohibited except the case of "ordinary sheet", even in the case of the viewpoint of "type". However, as far as AMS function is concerned, it functions effectively even when any setting information is given to sheet feed cassette 41, except an occasion wherein the AMS function is prohibited for "irregular size" and "wide sheet" representing the setting information relating to "size".

Functions and effects of the image forming apparatus representing the aforesaid example of structure will be explained as follows, referring to an example of concrete work procedures and a flow chart in FIG. 19.

Figure 19:
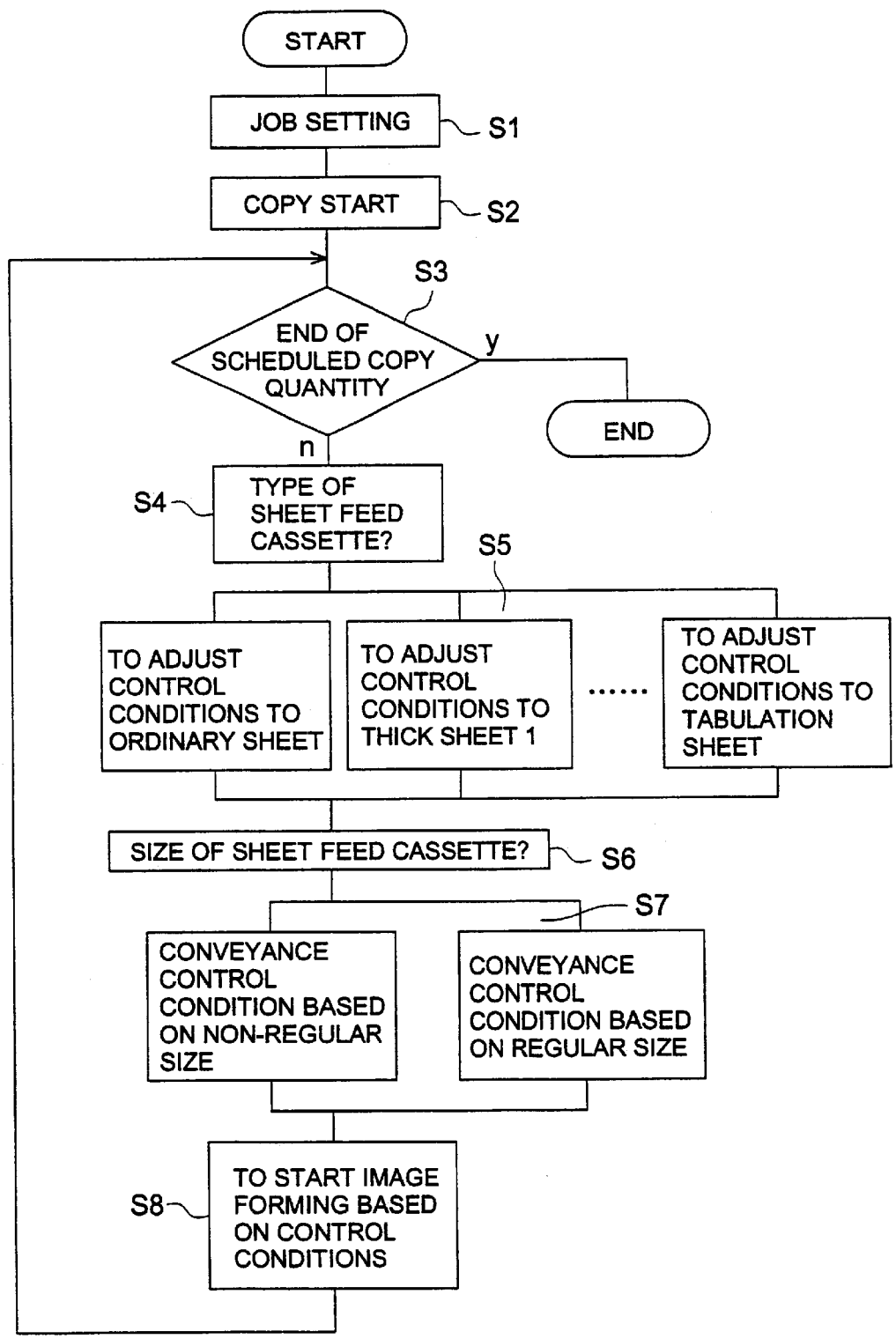
FIG. 19 is a flow chart of an image forming apparatus relating to the present embodiment.

First, prior to explanation of a flow chart in FIG. 19, a controller sets setting information of "type" and "size" for each of sheet feed cassette 41 and outer sheet feed means 41L with a controller setting mode in operation/display section 81. In the detailed explanation of this setting again, when trying to set the setting information relating to "regular special size" on a certain sheet feed cassette 41, with respect to "size" relating to transfer sheet P for each sheet feed cassette 41, a setting image plane shown in FIG. 5 is made to be displayed on the operation/display section 81 from the controller setting mode, and then, "special size setting" is pressed, then, the image plane for size setting appears.

Then, after selecting the sheet feed cassette 41 that is to be set, a size of transfer sheet P to be stored in the sheet feed cassette 41 is inputted. To be concrete, a "regular size" button is selected if the transfer sheet is in a regular size, or a "regular special size" button is selected if the transfer sheet is in a regular special size, and then, the desired size is selected from several sizes (default value) stipulated in advance, as shown on a pop-up image plane in FIG. 7. When trying to set setting information concerning a "irregular size", a "irregular size" button is pressed. Then, a pop-up image plane shown in FIG. 8 appears. In this case, a length of the transfer sheet P in its conveyance direction (hereinafter referred to as the longitudinal direction) and a length in the direction perpendicular to the aforesaid conveyance direction (hereinafter referred to as the lateral direction) are inputted directly through numeral keys shown in the state of a ten-key in the drawing, and thereby the setting is carried out.

In the same way, when a "wide sheet" button is pressed, a pop-up image plane shown in FIG. 9 appears. In this case, a "regular size" representing a certain standard is selected, and when its detailed size needs to be changed, a "size input" button is selected to input directly from a pop-up image plane shown in FIG. 10. Incidentally, in this case, inputting can also be conducted by inputting a value of difference from "regular size" (in the drawing, icons for an upward arrow mark and a downward arrow mark are pressed). Further, on the rightmost side in FIG. 9, there is conducted setting about whether to position an image to be formed on the wide sheet at a "leading edge" of transfer sheet P (namely, an upper side of the transfer sheet P) or to position it at the center (centering). This point will be explained again later when "image control condition" stated later is explained.

In the present embodiment, it is possible to conduct setting about types, in addition to the setting about sizes mentioned above. In that case, sheet feed cassette 41 to be set is selected in FIG. 5, and then, an icon corresponding to the type of transfer sheets stored (for example, "ordinary sheet", "thick sheet 1", "thin sheet" or "tabulation sheet") is pressed, thus, the setting about types can also be carried out in addition to the aforesaid size setting for each sheet cassette 41.

On the other hand, with regard to outer sheet feed means 41L, setting about types can be carried out from operation/display section 81 in the same way as in sheet feed cassette 41 as stated above, while, for setting about sizes, a serviceman inputs setting information by means of non-volatile setting. Incidentally, as stated already, it is not considered in general that setting information is changed frequently on the outer sheet feed means 41L. Therefore, it may be preferable that input work for setting information is limited to non-volatile setting conducted by a serviceman.

Setting information about types and sizes set for each sheet feed cassette 41 and outer sheet feed means 41L in the way stated above are made to correspond to each of sheet feed cassette 41 and outer sheet feed means 41L and are stored in storage means 83 shown in FIG. 3.

Incidentally, setting (input) work for these setting information is usually conducted before conducting all operations concerning actual copying. In the present embodiment, once the setting information has been set, it is possible to execute routine operations of the image forming apparatus by using the set information as it is. Namely, with regard to the information which has been set, setting information relating to each sheet feed cassette 41 is stored and maintained in non-volatile storage means 83 even when the power supply for the apparatus main body is turned off, and when the power supply is turned on again, the information which has been set before turning off of the power supply can be used as it is. Thus, it is possible to avoid troubles that setting information must be inputted each time, and continuity of operations can be kept, which is convenient for a user. Namely, owing to the means stated above, it is possible to avoid that the set information is lost accidentally by a fault of a user.

However, it is naturally possible to change the information set through the aforesaid operation/display section 81 or non-volatile setting, while the image forming apparatus is in the state of service (for example, the occasion wherein the power supply is turned on and image forming is not conducted).

Then, when a user starts copying, JOB setting work is conducted first (FIG. 19 S1). With regard to this setting work, there is conducted, in area 811, the designation relating to the state of output for transfer sheet P after completion of copying, especially to the aforesaid copy finishing section 70, for example, and there are set, in area 812, automatic two-sided document conveyance section 100 in image reading section 10 and the state of image forming (two-sided or single-sided for document S and transfer sheet P), as shown in FIG. 4. Further, copy (image forming) density is set in area 813, copy magnification is set in area 814, transfer sheet P on which an image is formed is selected in 81a, and various applied settings as those illustrated are set in area 815.

When an unillustrated copy start button is pressed after completion of setting, there is started copy (image forming) controls in the following S3–S8 (S2). In this case, the "type" set on the aforesaid image plane for setting types of transfer sheets is acquired on sheet feed cassette 41 to be used in the JOB or on outer sheet feed means 41L (S4). Then, as illustrated on Table 2, control conditions such as process conditions are made to match with the "type" set on the sheet feed cassette 41 to be use or on outer sheet feed means 41L (S5).

Incidentally, in this case, if a mode or a function prohibited in the "type" is set through JOB setting in S1, it is prohibited, warning is displayed on operation/display section 81 and image forming is discontinued.

Then, the "size" set on the aforesaid image plane for setting sizes of transfer sheets is acquired on the sheet feed cassette 41 selected (to be used) or on outer sheet feed means 41L (S6). In this case, when "regular size" is selected, information of size detection means 43 is read to detect which regular size among plural regular sizes corresponds to the transfer sheet. Then, in the same way as in the occasion where "regular special size" is selected, there are set conveyance conditions which are stored in non-volatile memory 82 and are based on each size control specification (S7), and image forming is started under the aforesaid conveyance conditions and the control conditions matched in S5 (S8). On the other hand, when "irregular size" and "wide sheet" are selected, conveyance conditions are set (S7) by adding correction value α while referring to conveyance conditions stipulated in approximate regular size (regular size) as stated above, and image forming is started (S8) under the aforesaid conveyance conditions and the control conditions matched in S5 (S8). Thus, image forming for the planned number of sheets is completed (S4), which means completion of image forming.

Incidentally, in the present embodiment, an arrangement is made so that a size of a transfer sheet is set on a sheet feed cassette 41 by a controller (setting of "regular special size", "irregular size" and "wide sheet"). Therefore, when a controller makes a mistake in the setting, there is a possibility of an occurrence of troubles (for example, jamming) in the conveyance system. On the other hand, the image forming apparatus of the present embodiment is provided with size detection means 43 for detecting a size of a transfer sheet stored in sheet feed cassette 41. It is therefore possible to prevent the troubles stated above as far as possible by utilizing the size detection means 43. Namely, when the size set does not correspond to the size detected by the size detection means 43 in the case where "setting mode" is selected, it is possible to prohibit image forming after giving warning (for example, displaying on scanning/display section 81, or giving warning sound) or it is possible to make image forming to be conducted under the control conditions corresponding to the size detected by the size detection means 43. To be more concrete, since the size detection means 43 represents, together with central control means C, a regular size detection section for detecting either regular size among plural regular sizes, when a regular size which does not correspond to the set non-regular size (in this case, at least a length in the longitudinal direction needs to be known) is detected at the regular size detection section, image forming is prohibited after giving warning, or image forming is made to be conducted under the control conditions corresponding to "detection mode" or to the regular size detected. In this case, "a regular size which does not correspond to the non-regular size is detected" means an occasion wherein a regular size other than the regular size which is smallest among regular sizes greater than the non-regular size is detected by the regular size detection section in at least the longitudinal direction (lengthwise direction), or an occasion wherein a regular size other than the regular size which is greatest among regular sizes smaller than the non-regular size is detected.

In the image forming apparatus of the present embodiment, when "regular size" is selected as shown in FIG. 6, it means that "detection mode" for conducting image forming under the control conditions corresponding to the size detected by the regular size detection section is selected, while when "regular special size", "irregular size" and "wide sheet" are selected as shown in FIG. 7–FIG. 10, it means that "setting mode" for conducting image forming under the control conditions corresponding to the information set is selected. Namely, the image forming apparatus of the present embodiment has two modes including "detection mode" and "setting mode", which is arranged so that either one of them can be selected by operation/display section 81. However, it is also possible to arrange so that the selection of either one of the "detection mode" and the "setting mode" is not conducted on the setting image plane as shown in FIG. 6–FIG. 10, but is conducted through another way. For example, it is possible to arrange so that either one of them is selected on an image plane other than the image plane for setting "size" of sheet feed cassette 41 in the controller setting mode.

In this case, when a size is not set for sheet feed cassette 41 on the size setting image plane in FIG. 7–FIG. 10 in spite of the "setting mode" selected, image forming can be conducted not under the "setting mode" but under the "detection mode".

Further, when the aforesaid disagreement exists, a method to solve it through operations of "detection mode" as stated above is effective. However, it is also possible to take, before solving the disagreement, an arrangement wherein warning is displayed on the operation/display section 81 with reference to information from size detection means 43 at the point of time when such transfer sheet P is stored and a size of the transfer sheet P is inputted. By doing this, the disagreement between the set information and the actual state can be avoided.

Incidentally, in the present embodiment, there has been explained an occasion wherein only size detection means 43 that detects a size of transfer sheet P in sheet feed cassette 41 is provided. However, a type detection means that detects a type of transfer sheet P can be provided for each sheet feed cassette 41 in the same way. For example, as the type detection means, it is possible to arrange so that electric conductivity, surface roughness, color and transmittance of transfer sheet P stored in sheet feed cassette 41 are detected, then, information obtained here is inputted in central control means C, and a type of the transfer sheet P is judged based on information obtained by the central control means C.

Next, there will be explained functions and actions relating to image forming wherein bypass feed tray 41H is utilized. The copying employing the bypass feed tray 41H corresponds to the special occasion of operations in "setting mode".

With regard to the bypass feed tray 41H, it is possible to set setting information of "type" and "size" in the same way as in sheet feed cassette 41 as stated above. What is especially important in the present embodiment is that the use of the bypass feed tray 41H makes it possible to cope with (interruption) copying.

Namely, with regard to sheet feed cassette 41 and outer sheet feed means 41L, it is usually supposed that the setting information as that stated above is set, and transfer sheet P that agrees with the setting information is stored and used. However, in some cases, there is requirement of copying on an interruption basis for the transfer sheet P whose type or size does not agree with any of the aforesaid set information. In this case, it is effective, in the present embodiment, that bypass feed tray 41 is used.

A user who utilizes bypass feed tray 41 first confirms a type or a size of the transfer sheet P to be used for image forming, and then the user places the transfer sheet P on the bypass feed tray 41, or presses a button that is expressed with "MANUAL" to show that it is bypass feed tray 41 on area 81a in basic image plane (FIG. 4) displayed on operation/display section 81, upon which, the aforesaid bypass feed setting image plane (FIG. 11–FIG. 14) is displayed on the operation/display section 81. As stated above, this bypass feed setting image plane is basically the same as the setting image plane (FIG. 5–FIG. 10) for "type" and "size" in sheet feed cassette 41. However, the setting image plane in sheet feed cassette 41 is of the setting under the controller setting mode wherein the setting image plane can not be set by anyone except a controller, as stated above, while, the bypass feed setting image plane of the bypass feed tray 41H is arranged so that it can be set by anyone without being limited to a controller, namely by users in general.

Figure 20:
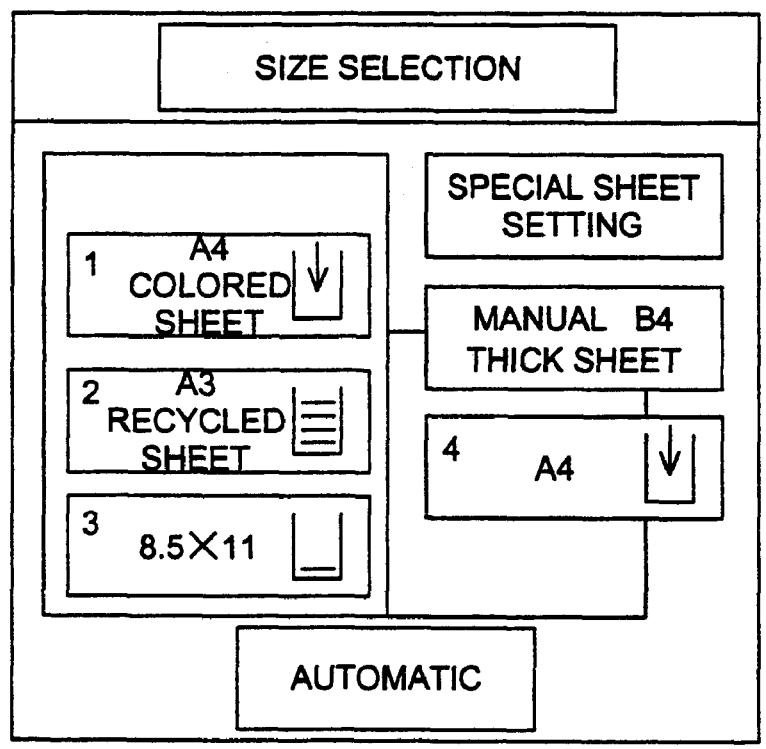
FIG. 20 is an illustration showing a display image plane which appears when inputting of setting information for a bypass feed tray is completed.

Then, after completion of setting for transfer sheet P placed (or, to be placed) on the bypass feed tray 41H, an image plane goes back to the basic image plane in FIG. 4 as stated above. In this case, "type" and "size" which have been set are displayed on the portion corresponding to the bypass feed tray 41H on the based image plane. Namely, upon completion of setting, an image plane as that shown in FIG. 20 is displayed on area 81a on the basic image plane in FIG. 4, and it is indicated that "special sheet setting" relating to a type and a size has been set for the bypass feed tray 41H. Incidentally, in the case of FIG. 20, it is indicated that setting of "B4 thick sheet" has been has been conducted, as an example of the foregoing. Then, setting of JOB is conducted on the basic image plane (S1 in FIG. 19). After that, the transfer sheet is fed from the bypass feed tray 41H in the same way as in the flow in FIG. 19 stated above, and image forming is conducted.

Incidentally, for the bypass feed tray 41H, it is possible to employ either an arrangement wherein information once set regarding the aforesaid bypass feed tray 41H is preserved in non-volatile memory 82 until new setting information is inputted, or an arrangement wherein the state returns to the original state automatically after the passage of a certain period of time.

By employing an arrangement wherein setting information can be set regarding bypass feed tray 41H as stated above, it is possible not only to cope with a user on an interruption basis, but also to conduct image forming on a special sheet or on a non-regular sheet for any users.

As explained above, in the image forming apparatus of the present embodiment, it is possible to set setting information composed of information concerning "type" and "size" for each of sheet feed cassette 41 and outer sheet feed means 41L, and when these sheet feed cassette 41 and others are selected by direct input through operation/display section 81 or by APS function, control conditions are automatically selected and determined, based on the setting information set on the sheet feed cassette 41, and operations of the image forming apparatus are realized by the aforesaid control conditions applied. Therefore, it is possible to copy extremely easily for transfer sheets P of any types and any sizes. In this connection, when trying to copy on transfer sheet P having a special type or size in the past, it was impossible to copy without conducting complicated operations such as those in "mode setting". Compared with this, workability of the image forming apparatus of the present embodiment is evaluated to be improved exceedingly.

Incidentally, this effect of the image forming apparatus of the present embodiment is exhibited clearly, in particular, when copying in the "inter sheet system" is carried out. Copying in the "inter sheet system" means a copying system wherein copying for plural "A4 ordinary sheet" is conducted for a group of documents S, for example, and copying on "A4 thick sheet" or "non-regular size colored sheet" is conducted on an interruption basis and periodically, on the half way of the aforesaid copying while stacking the plural A4 ordinary sheet copies mentioned above. The "A4 thick sheet" corresponding to "on the half way" in this case is made, for example, to be a "cover" or a "back cover" in completion of binding, and "non-regular size colored sheet" is equally made to be "sheets to be bound" in completion of binding.

To cope with copying and binding like those in the aforesaid example, if setting information of "A4 ordinary sheet" is set on sheet feed cassette $41_1$, setting information of "A4 thick sheet" is set on sheet feed cassette $41_2$, and setting information of "irregular size and colored sheet" is set on sheet feed cassette $41_3$, in the image forming apparatus in the present embodiment, for example, these can be executed perfectly and automatically. Namely, the reason for the foregoing is as follows. In the aforesaid case, with regard to control conditions for the image forming apparatus, those relating to "A4 ordinary sheet" are usually selected and applied, while, when sheet feed cassette $41_2$ is selected for "execution of inter-sheet", corresponding control conditions are selected and determined automatically based on setting information set on the sheet feed cassette $41_2$.

In the image forming apparatus of the present embodiment, complicated bookbinding work handling transfer sheets in plural types and sizes can be carried out on a completely automatic manner without requiring complicated operations at all, as stated above.

Further, in the present embodiment, it is possible to execute interruption copying mechanically for transfer sheet P whose type or size is not set on the sheet feed cassette 41 and outer sheet feed means 41L by making it possible to input setting information each time on bypass feed tray 41H.

Incidentally, though there has been given explanation wherein a copying machine is mainly taken into consideration as an image forming apparatus in the embodiment, the invention is not limited to this embodiment. Namely, a printer to be provided to a personal computer or a facsimile machine is assumed, and embodiment conceived from the printer or the facsimile machine is also in the scope of the invention. Further, the so-called "hybrid machine" having functions of an image forming apparatus, a printer and a facsimile machine together is naturally in the scope of the invention.

Further, though setting information to be set on each sheet feed cassette 41 in the aforesaid embodiment is one composed of "type" and "size", the invention is not limited to the embodiment. For example, it is also possible to employ an arrangement wherein the state of preservation for transfer sheet P, to be more concrete, the moisture degree resulted from leaving for a long time is taken into consideration, and a concept of the "state of preservation" is included in the aforesaid setting information to change the control conditions with the moisture degree. For example, with regard to the aforesaid "moisture", it is possible to consider the occasion to add the control condition such as one to change the feed out speed in transfer sheet conveyance section 40 in accordance with a difference of the degree of moisture.

Further, in the foregoing, though the operation/display section 81 is provided as an input section for setting "type" and "size" and as a selection section for selecting "detection mode" and "setting mode", the invention is not limited to this embodiment. For example, when the image forming apparatus is connected to a certain network such as LAN, embodiment wherein operations, inputting, setting and selection are executed through communication by a computer on the network is possible, and in this case, an input section or a selection section forms a portion (network interface or print controller section) where the image forming apparatus is connected with the network, and the computer serves as a setting section.

Further, in the image forming apparatus of the present embodiment, a size of document S is detected by a document size detection means (optical document size sensor 18 and document size detection section for RADF) in image reading section 10. However, even for this, it is possible to have embodiment with an arrangement wherein, when the image forming apparatus is connected to the aforesaid network, and when image data are transmitted from the computer through the network, the image data are regarded as a "document" and thereby its size is made to correspond to "document size" In this case, when the facsimile machine is assumed as the image forming apparatus, it is rather a natural embodiment.

As explained above, in the image forming apparatus of the invention, setting information of types and non-regular sizes are set in each of a plurality of recording material storage sections, and when one recording material storage section is selected out of these plural recording material storage sections, the control condition is automatically selected and determined based on setting information set in that recording material storage section, and image forming is conducted by the aforesaid control conditions applied. Therefore, compared with the case where image forming was conducted by the method of setting modes each time a type and a size are changed in the past, workability is improved exceedingly.

In the image forming apparatus of the invention, when conducting image forming on a transfer material which does not correspond to setting information set on the recording material storage section, image forming can be conducted by utilizing a bypass feed tray. To be more concrete, when conducting image forming on a recording material on the aforesaid bypass feed tray, setting image plane for setting thereon setting information of type and/or size of a recording material is displayed, thereby the setting information can be inputted, then, the aforesaid control conditions are selected and determined based on the information mentioned above, thus, image forming on an interruption basis can be carried out.

What is claimed is:

1. An image forming apparatus comprising:

a manual tray member for feeding a recording material having a non-regular size;

a first input device for inputting size information corresponding to the non-regular size of the recording material, so that the size information has non-regular values corresponding to longitudinal and lateral length of the recording material;

a display device for indicating sheet type information with respect to the recording material in the manual tray member;

a second input device for inputting selecting information to indicate a sheet type of the recording material with respect to an ordinary sheet and a special sheet;

a memory device for storing the size information and the selecting information; and a controller for controlling an image forming operation according to the size information and the selecting information, both of which information are stored in the memory device.

2. The image forming apparatus of claim 1, wherein the second input device provides icons corresponding to the sheet type information.

3. The image forming apparatus of claim 1, wherein the display device provides icons corresponding to the sheet type information.

4. The image forming apparatus of claim 1, wherein the first input device and the second input device are integrated into a single input device.

5. The image forming apparatus of claim 1, wherein the memory device is a non-volatile memory.

6. The image forming apparatus of claim 1, wherein the non-regular size includes a special regular size, an irregular size and a size of wide sheet.

7. The image forming apparatus of claim 1, wherein the ordinary sheet includes a recycled sheet and a colored sheet.

8. The image forming apparatus of claim 1, wherein the special sheet includes a thick sheet, a thin sheet and an OHP sheet.

* * * * *